United States Patent
Choi et al.

(10) Patent No.: US 11,418,912 B1
(45) Date of Patent: Aug. 16, 2022

(54) DYNAMIC MERGE AND SEPARATION OF RANGING SESSIONS IN UE-ENABLED SIDELINK POSITIONING

(71) Applicant: QUALCOMM Incorporated, San Diego, CA (US)

(72) Inventors: Chang-Sik Choi, Seoul (KR); Kapil Gulati, Belle Mead, NJ (US); Junyi Li, Fairless Hills, PA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/184,429

(22) Filed: Feb. 24, 2021

(51) Int. Cl.
*H04W 4/02* (2018.01)

(52) U.S. Cl.
CPC ............ *H04W 4/023* (2013.01); *H04W 4/027* (2013.01)

(58) Field of Classification Search
CPC .............................. H04W 4/023; H04W 4/027
See application file for complete search history.

(56) References Cited

U.S. PATENT DOCUMENTS

| | | | |
|---|---|---|---|
| 2015/0029873 A1 | 1/2015 | Subramanian et al. | |
| 2017/0238135 A1* | 8/2017 | Vamaraju | H04W 4/023 455/456.1 |
| 2020/0015038 A1 | 1/2020 | Burugupalli et al. | |
| 2020/0304970 A1 | 9/2020 | Jiang et al. | |

OTHER PUBLICATIONS

International Search Report and Written Opinion—PCT/US2022/011622—ISA/EPO—dated Apr. 8, 2022.

* cited by examiner

*Primary Examiner* — Curtis B Odom
(74) *Attorney, Agent, or Firm* — Thien T. Nguyen

(57) ABSTRACT

Independent ranging sessions that are initiated by multiple initiating user equipments (UEs) are monitored and combined into a single combined ranging session to reduce overhead. A UE monitors a first set of ranging sessions initiated by a first initiator UE, which include pre-ranging messages identifying UEs in the first set of ranging sessions, and monitors a second set of ranging sessions initiated by a second initiator UE, which include pre-ranging messages identifying UEs in the second set of ranging sessions. The UE initiates a third set of ranging sessions by broadcasting pre-ranging messages identifying UEs in the third set of ranging sessions that comprises the UEs in the first set of ranging sessions and the UEs in the second set of ranging sessions. The original initiator UEs, upon receiving the pre-ranging messages initiating the third set of ranging sessions, terminate the initiation of their ranging sessions.

42 Claims, 6 Drawing Sheets

500 —↘

| Monitor a first set of ranging sessions initiated by a first initiating UE, the first set of ranging sessions comprising a first plurality of pre-ranging messages broadcast by the first initiating UE that identifies UEs in the first set of ranging sessions | ⟵ 502 |

↓

| Monitor a second set of ranging sessions initiated by a second initiating UE, the second set of ranging sessions comprising a second plurality of pre-ranging messages broadcast by the second initiating UE that identifies UEs in the second set of ranging sessions | ⟵ 504 |

↓

| Initiate a third set of ranging sessions by broadcasting a third plurality of pre-ranging messages that identifies UEs in the third set of ranging sessions that comprises the UEs in the first set of ranging sessions and the UEs in the second set of ranging sessions | ⟵ 506 |

DYNAMIC MERGE AND SEPARATION OF RANGING SESSIONS IN UE-ENABLED SIDELINK POSITIONING

BACKGROUND

Background Field

The subject matter disclosed herein relates to wireless communications systems, and more particularly to methods and apparatuses for ranging or positioning of user equipment in a distributed wireless communications system.

Relevant Background

Obtaining accurate position information for user equipment, such as cellular telephones or other wireless communication devices, is becoming prevalent in the communications industry. For example, obtaining highly accurate locations of vehicles or pedestrians is essential for autonomous vehicle driving and pedestrian safety applications.

A common means to determine the location of a device is to use a satellite positioning system (SPS), such as the well-known Global Positioning Satellite (GPS) system or Global Navigation Satellite System (GNSS), which employ a number of satellites that are in orbit around the Earth. In certain scenarios, however, location determination signals from an SPS may be unreliable or unavailable, e.g., during adverse weather conditions or in areas with poor satellite signal reception such as tunnels or parking complexes. Moreover, position information generated using SPS is prone to imprecision. For example, off-the-shelf GPS positioning devices have an accuracy of a few meters, which is not optimal to ensure safe autonomous driving and navigation.

Coordinated or automated driving requires communications between vehicles, which may be direct or indirect, e.g., via an infrastructure component such as a roadside unit (RSU). For vehicle safety applications, both positioning and ranging are important. For example, vehicle user equipments (UEs) may perform positioning and ranging using sidelink signaling, e.g., broadcasting ranging signals for other vehicle UEs or pedestrian UEs to determine the relative location of the transmitter. An accurate and timely knowledge of the relative locations or ranges to nearby vehicles, enables automated vehicles to safely maneuver and negotiate traffic conditions. Round trip time (RTT), for example, is a technique commonly used for determining a range between transmitters. RTT is a two-way messaging technique in which the time between sending a ranging signal from a first device to receiving an acknowledgement (e.g., in the form of return ranging signal) from a second device (minus processing delays) corresponds to the distance (range) between the two devices.

Ranging sessions in a distributed system, i.e., without infrastructure support to coordinate messaging, may result in multiple ranging sessions occurring simultaneously that may include overlapping sets of participating UEs. Each ranging session may include multiple messages and ranging signals that are exchanged between the participating UEs and each ranging session may include multiple participating UEs. Accordingly, where multiple ranging sessions occur simultaneously, the signaling overhead may become excessively large and may undermine ranging and positioning of the UEs.

SUMMARY

Independent ranging sessions that are initiated by multiple initiating user equipments (UEs) are monitored and combined into a single combined ranging session to reduce overhead. The independent ranging sessions may be monitored over a period of time that is based on the speed of the initiator UEs, e.g., with lower speeds of the initiator UEs, the monitoring period may be increased. The combined ranging session may be initiated by a responder UE from the individual ranging sessions and include all UEs that participated the individual ranging sessions. Combined ranging sessions may be performed for a period of time that may also be based on the speed of the initiator UEs, e.g., with lower speeds of the initiator UEs, the duration of the combined ranging sessions may be increased.

In one implementation, a method of ranging performed by a first user equipment (UE) in a distributed system of UEs, includes monitoring a first set of ranging sessions initiated by a first initiator UE, the first set of ranging sessions comprising a first plurality of pre-ranging messages broadcast by the first initiator UE that identifies UEs in the first set of ranging sessions; monitoring a second set of ranging sessions initiated by a second initiator UE, the second set of ranging sessions comprising a second plurality of pre-ranging messages broadcast by the second initiator UE that identifies UEs in the second set of ranging sessions; and initiating a third set of ranging sessions by broadcasting a third plurality of pre-ranging messages that identifies UEs in the third set of ranging sessions that comprises the UEs in the first set of ranging sessions and the UEs in the second set of ranging sessions.

In one implementation, a first user equipment (UE) configured for ranging in a distributed system of UEs, includes a wireless transceiver configured to wirelessly communicate with entities in a wireless network; at least one memory; and at least one processor coupled to the wireless transceiver and the at least one memory, wherein the at least one processor is configured to: monitor a first set of ranging sessions initiated by a first initiator UE, the first set of ranging sessions comprising a first plurality of pre-ranging messages broadcast by the first initiator UE that identifies UEs in the first set of ranging sessions; monitor a second set of ranging sessions initiated by a second initiator UE, the second set of ranging sessions comprising a second plurality of pre-ranging messages broadcast by the second initiator UE that identifies UEs in the second set of ranging sessions; and initiate a third set of ranging sessions by being configured to broadcast, via the wireless transceiver, a third plurality of pre-ranging messages that identifies UEs in the third set of ranging sessions that comprises the UEs in the first set of ranging sessions and the UEs in the second set of ranging sessions.

In one implementation, a first user equipment (UE) configured for ranging in a distributed system of UEs, includes means for monitoring a first set of ranging sessions initiated by a first initiator UE, the first set of ranging sessions comprising a first plurality of pre-ranging messages broadcast by the first initiator UE that identifies UEs in the first set of ranging sessions; means for monitoring a second set of ranging sessions initiated by a second initiator UE, the second set of ranging sessions comprising a second plurality of pre-ranging messages broadcast by the second initiator UE that identifies UEs in the second set of ranging sessions; and means for initiating a third set of ranging sessions by broadcasting a third plurality of pre-ranging messages that identifies UEs in the third set of ranging sessions that comprises the UEs in the first set of ranging sessions and the UEs in the second set of ranging sessions.

In one implementation, a non-transitory storage medium including program code stored thereon, the program code is operable to configure at least one processor in a first user equipment (UE) configured for ranging in a distributed system of UEs, the program code comprising instructions to: monitor a first set of ranging sessions initiated by a first initiator UE, the first set of ranging sessions comprising a first plurality of pre-ranging messages broadcast by the first initiator UE that identifies UEs in the first set of ranging sessions; monitor a second set of ranging sessions initiated by a second initiator UE, the second set of ranging sessions comprising a second plurality of pre-ranging messages broadcast by the second initiator UE that identifies UEs in the second set of ranging sessions; and initiate a third set of ranging sessions by broadcasting a third plurality of pre-ranging messages that identifies UEs in the third set of ranging sessions that comprises the UEs in the first set of ranging sessions and the UEs in the second set of ranging sessions.

In one implementation, a method of ranging performed by a first user equipment (UE) in a distributed system of UEs, includes initiating a first set of ranging sessions by broadcasting first pre-ranging messages that identify the first UE and a first plurality of responder UEs in each ranging session in the first set of first ranging sessions; receiving second pre-ranging messages from a second UE to initiate a second set of ranging sessions, the second pre-ranging messages from the second UE identify the second UE and a second plurality of responder UEs in the second ranging session, the second plurality of responder UEs comprises the first UE, a third UE that initiated a third set of ranging sessions, and responder UEs from the first set of ranging sessions and the third set of ranging sessions; and terminating the initiation of the first set of ranging sessions in response to receiving one of the second pre-ranging messages from the second UE to initiate the second set of ranging sessions.

In one implementation, a first user equipment (UE) configured for ranging in a distributed system of UEs, includes a wireless transceiver configured to wirelessly communicate with entities in a wireless network; at least one memory; and at least one processor coupled to the wireless transceiver and the at least one memory, wherein the at least one processor is configured to: initiate a first set of ranging sessions by broadcasting first pre-ranging messages that identify the first UE and a first plurality of responder UEs in each ranging session in the first set of first ranging sessions; receive second pre-ranging messages from a second UE to initiate a second set of ranging sessions, the second pre-ranging messages from the second UE identify the second UE and a second plurality of responder UEs in the second ranging session, the second plurality of responder UEs comprises the first UE, a third UE that initiated a third set of ranging sessions, and responder UEs from the first set of ranging sessions and the third set of ranging sessions; and terminate the initiation of the first set of ranging sessions in response to receipt of one of the second pre-ranging messages from the second UE to initiate the second set of ranging sessions.

In one implementation, a first user equipment (UE) configured for ranging in a distributed system of UEs, includes means for initiating a first set of ranging sessions by broadcasting first pre-ranging messages that identify the first UE and a first plurality of responder UEs in each ranging session in the first set of first ranging sessions; means for receiving second pre-ranging messages from a second UE to initiate a second set of ranging sessions, the second pre-ranging messages from the second UE identify the second UE and a second plurality of responder UEs in the second ranging session, the second plurality of responder UEs comprises the first UE, a third UE that initiated a third set of ranging sessions, and responder UEs from the first set of ranging sessions and the third set of ranging sessions; and means for terminating the initiation of the first set of ranging sessions in response to receiving one of the second pre-ranging messages from the second UE to initiate the second set of ranging sessions.

In one implementation, a non-transitory storage medium including program code stored thereon, the program code is operable to configure at least one processor in a first user equipment (UE) configured for ranging in a distributed system of UEs, the program code comprising instructions to: initiate a first set of ranging sessions by broadcasting first pre-ranging messages that identify the first UE and a first plurality of responder UEs in each ranging session in the first set of first ranging sessions; receive second pre-ranging messages from a second UE to initiate a second set of ranging sessions, the second pre-ranging messages from the second UE identify the second UE and a second plurality of responder UEs in the second ranging session, the second plurality of responder UEs comprises the first UE, a third UE that initiated a third set of ranging sessions, and responder UEs from the first set of ranging sessions and the third set of ranging sessions; and terminate the initiation of the first set of ranging sessions in response to receiving one of the second pre-ranging messages from the second UE to initiate the second set of ranging sessions.

BRIEF DESCRIPTION OF THE DRAWING

Non-limiting and non-exhaustive aspects are described with reference to the following figures, wherein like reference numerals refer to like parts throughout the various figures unless otherwise specified.

DETAILED DESCRIPTION

Figure 1:
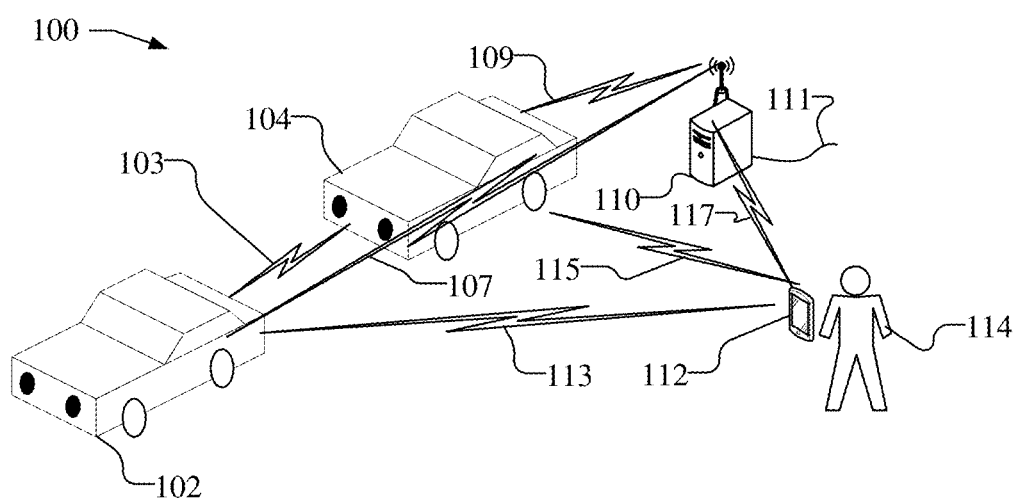
FIG. 1 illustrates a wireless communication system illustrating distributed communications, including ranging signaling to support multiple ranging sessions and/or positioning.

A distributed approach may be used for ranging and positioning of vehicles, roadside units (RSU), and pedestrian and may avoid the need for a centralized base station to coordinate and relay communications. Such communications may be used, for example, for automated driving and vehicle safety applications. Communications used in a distributed approach may be made directly, e.g., between vehicles, or between vehicles and a RSU or pedestrian. These communications may include messaged and information elements (IEs) with which a vehicle may provide information necessary for automated driving.

For example, for safe operation of autonomous vehicles, the relative locations or ranges to other vehicles needs to be determined. Various approaches may be used to derive the relative positions between vehicles. For example, relative positions of vehicles may be derived using ranging signaling. Ranging signals are sometimes referred to as physical ranging signals, positioning ranging signals, positioning reference signals, or physical referencing signals, and may be collectively referred to herein as PRS signals. PRS signals, for example, may be broadcast by a user equipment (UE) in a vehicle, sometimes referred to as V-UE, and received by other V-UEs and/or infrastructure, e.g., RSU, or UEs held by a pedestrian, using direct communication systems, such as dedicated short-range communication (DSRC), cellular Vehicle-to-Everything (C-V2X) communication, and even 5G New Radio (NR) communications. PRS signals are used to determine a range to the broadcasting vehicle, e.g., using one way ranging, round-trip-time (RTT) positioning operations, or other standard positioning operations such as time of arrival (TOA), time difference of arrival (TDOA) or observed time difference of arrival (OT-DOA).

In a distributed system, an individual UE is able to range with respect to other UEs that are nearby using messages and positioning signals that are transmitted directly to the other UEs. In an RTT-based ranging session, for example, multiple messages and signals are transmitted and received by each UE. For example, an initial set of pre-ranging signal messages (pre-PRS messages) are transmitted and received to request and accept a ranging session, followed by broadcasting the ranging signals (PRS signals) for measurement, which is followed by a set of post-ranging signal messages (post-PRS messages) that exchange measurement payloads. For RTT-based ranging and positioning, for example, the time of arrival (TOA) and time of departure (TOD) measurements of transmitted and received PRS signals may be provided in the post-PRS messages and used by each UE pair to determine the range between the UEs. The pre-PRS and post-PRS messages may be sent over a licensed spectrum to guarantee reliability, while the PRS signals may be broadcast over an unlicensed spectrum (e.g., to enjoy a larger available bandwidth in e.g., UNI-III spectrum).

The distributed mechanism ensures a minimum overhead, but multiple nearby UEs may initiate separate ranging sessions independently of each other. Thus, multiple uncoordinated ranging sessions may be autonomously initiated by separate UEs. For example, without overhead communications to control ranging sessions, multiple UE may separately broadcast their own pre-PRS signals to the same set of responder UEs resulting in two independent ranging sessions that include the same responder UEs and that occur at the same time. For example, multiple V-UEs may initiate separate ranging sessions with the same set of RSUs. Moreover, nearby pedestrian held UEs may likewise initiate ranging sessions with the same set of RSUs. The number of messages exchanged in each separate ranging session may be large, particularly if there are a number of responder UEs. Further, some signaling, such as the PRS signals, may be broadcast over an unlicensed spectrum, which may delay transmissions due to listen-before-transmit (LBT) procedures used with the unlicensed spectrum. Accordingly, a significant overhead may be present when there are multiple overlapping ranging sessions. The overhead may undermine ranging and positioning in the sessions, e.g., due to additional delays in receiving signaling.

Accordingly, in an implementation, as discussed herein, a UE, such as an RSU or other anchor UE, may monitor multiple sets of ranging sessions that are initiated by different initiator UEs, wherein each set of ranging sessions include broadcast pre-ranging messages that identify the UEs participating in each set of ranging sessions. The UE may take over the ranging sessions by initiating its own combined ranging sessions by broadcasting pre-ranging messages that includes all of the UEs participating in the monitored ranging sessions. Each original initiator UE may terminate the initiation of ranging sessions, e.g., terminate broadcasting pre-ranging signals, when it is included in the combined ranging session and will participate in combined ranging sessions as a responder UE. The original ranging sessions may be monitored by the UE, for example, for a period of time T1 before the UE initiates the combined ranging session. Moreover, the UE may continue initiating the combined ranging session for a period of time T2. The length of the periods of time T1 and T2, for example, may be based on the speeds of the original initiator UEs. For example, the period of time T1 may be relatively short if the speeds of the original initiator UEs are relatively high and the period of time T1 may be relatively long if the speeds of the original initiator UEs are relatively low. Similarly, the period of time T2 may be relatively short if the speeds of the original initiator UEs are relatively high and the period of time T2 may be relatively long if the speeds of the original initiator UEs are relatively low. An indication of the period of time T2 may be sent to the original initiator UEs, e.g., in the pre-PRS message for the combined ranging sessions so that the original initiator UEs know when they can start initiating their own separate ranging sessions again.

FIG. 1 illustrates a wireless communication system 100 illustrating distributed communications, including ranging signaling to support multiple ranging sessions and/or positioning, as described herein. Wireless communication system 100 illustrates a first vehicle 102 with a first wireless device, e.g., V-UE 102, in wireless communications with another V-UE 104, illustrated as a second vehicle. The V-UE 102 and V-UE104 may comprise, but are not limited to, an on-board unit (OBU), a vehicle or subsystem thereof, or various other communication devices. The V-UEs 102 and 104 function and provide communications on behalf of their associated vehicles and, accordingly, may be sometimes referred to herein simply as vehicles 102 and 104 or UEs 102 and 104. The first UE 102 and second UE 104, for example, may be two vehicles traveling on a road along with other vehicles, not illustrated.

The wireless communication system 100 may use, e.g., Vehicle-to-Everything (V2X) communication standard, in which information is passed between a vehicle and other entities within the wireless communication network. The V2X services include, e.g., services for Vehicle-to-Vehicle (V2V), Vehicle-to-Pedestrian (V2P), Vehicle-to-Infrastructure (V2I), and Vehicle-to-Network (V2N). The V2X standard aims to develop autonomous or semi-autonomous driving systems, such as Advanced Driver Assistance System (ADAS), which helps drivers with critical decisions, such as lane changes, speed changes, overtaking speeds, and may be used to assist in parking as discussed herein. Low latency communications are used in V2X and are therefore suitable for precise relative positioning, e.g., using ranging signals, such as one way ranging, RTT, TDOA, etc.

In general, there are two modes of operation for V2X services, as defined in Third Generation Partnership Project (3GPP) TS 23.285. One mode of operation uses direct wireless communications between V2X entities, which may sometimes be referred to as sidelink communication. The other mode of operation uses network based wireless communication between entities. The two modes of operation may be combined, or other modes of operation may be used if desired.

The wireless communication system 100 may operate using direct or indirect wireless communications between the UE 102 and UE 104. For example, the wireless communication may be over, e.g., Proximity-based Services (ProSe) Direction Communication (PC5) reference point as defined in 3GPP TS 23.303, and may use wireless communications under IEEE 1609, Wireless Access in Vehicular Environments (WAVE), Intelligent Transport Systems (ITS), and IEEE 802.11p, on the ITS band of 5.9 GHz, or other wireless connections directly between entities. Thus, as illustrated, UE 102 and UE 104 may directly communicate using with a Vehicle-to-Vehicle (V2V) communication link 103. UE 102 and UE 104 may similarly directly communicate with roadside unit (RSU) 110 via Vehicle-to-Infrastructure (V2I) communication links 107 and 109, respectively. The RSU 110 may include a backhaul connection to a network, illustrated by wired connection 111, but may via a wireless Uu interface to a base station. The RSU 110, for example, may be a stationary infrastructure entity, that may support V2X applications and that can exchange messages with other entities supporting V2X applications. An RSU may be a logical entity that may combine V2X application logic with the functionality of base stations in a RAN, such as an eNB, ng-eNB, or eLTE (referred to as eNB-type RSU) or a gNB, or UE (referred to as UE-type RSU). The RSU 110 may be used for ranging with UEs 102, 104, or other UEs, and because the position of the RSU 110 may be known precisely, the RSU 110 may be used as an anchor UE with which a position of the UE 102, 104 or other UEs may be determined. The RSU 110 may sometimes be referred to herein as UE 110. The UEs 102, 104 and UE 110 may communicate with additional entities, such as additional vehicles, RSUs or with a UE 112 held by pedestrian 114 using direct communication links. For example, UE 102 may communicate with UE 112 via V2V communication link 113, UE 104 may communicate with UE 112 via V2V communication link 115, and UE 110 may communicate with UE 112 via V2I communication link 117.

During direct communications with one or more entities in the V2X wireless communication system 100, each entity may provide V2X information, such as an identifier for the V2X entity, as well as other information in messages such as Common Awareness Messages (CAM) and Decentralized Notification Messages (DENM) or Basic Safety Message (BSM), which may be used for, e.g., ADAS or safety use cases.

In other implementations, UE 102 and UE 104 may indirectly communicate with each other, e.g., through the RSU 110 via the V2I communication links 107 and 109, respectively or through other network infrastructure (not shown), e.g., using cellular vehicle-to-everything (CV2X). For example, vehicles may communicate via a base station in a Radio Access Network (RAN), such as an evolved Node B (eNB) or next generation evolved Node B (ng-eNB) in LTE wireless access and/or evolved LTE (eLTE) wireless access or a NR Node B (gNB) in Fifth Generation (5G) wireless access.

UEs 102 and 104 may initiate and perform ranging/positioning sessions, including sending pre-PRS messages, broadcasting PRS, and sending post-PRS messages on links 103, 107, 109, 113 or 115, with which the range or relative positions between UEs 102 and 104 may be determined. The PRS broadcast by UEs 102 and 104 may be any signal suitable for ranging, e.g., as defined for DSRC or C-V2X. The PRS may be broadcast on licensed or unlicensed spectrum. For example, in some implementations, PRS may be broadcast on one or more Unlicensed National Information Infrastructure (UNII) radio bands including, for example, one or more of the UNII-1 radio band, the UNII-2A radio band, the UNII-2B radio band, or the UNII-3 radio band. When broadcasting on unlicensed spectrum, listen-before-transmit (LBT) protocols may be employed.

Where UEs 102 and 104 broadcast PRS in a V2V link 103, the range or relative positions between UEs 102 and 104 may be determined directly. Where UE 102 and 104 broadcast PRS in V2I links 107 and 109 or via links 113 and 115, the range or relative positions between UE 102 and UE 110 or UE 112 and between UE 104 and UE 110 or UE 112 may be determined directly.

The direct wireless communications between the UE 102 and 104 and UE 110 and UE 112, do not require any network infrastructure and enable low latency communications, which is advantageous for precise ranging or positioning. Accordingly, such direct wireless communications may be desirable for ranging over short distances, e.g., with nearby vehicles or infrastructure.

The UEs, e.g., any of V-UE 102, V-UE 104, RSU 110, and UE 112, shown in FIG. 1, may be configured to perform ranging and/or positioning operations, such as RTT-based ranging.

Figure 2:
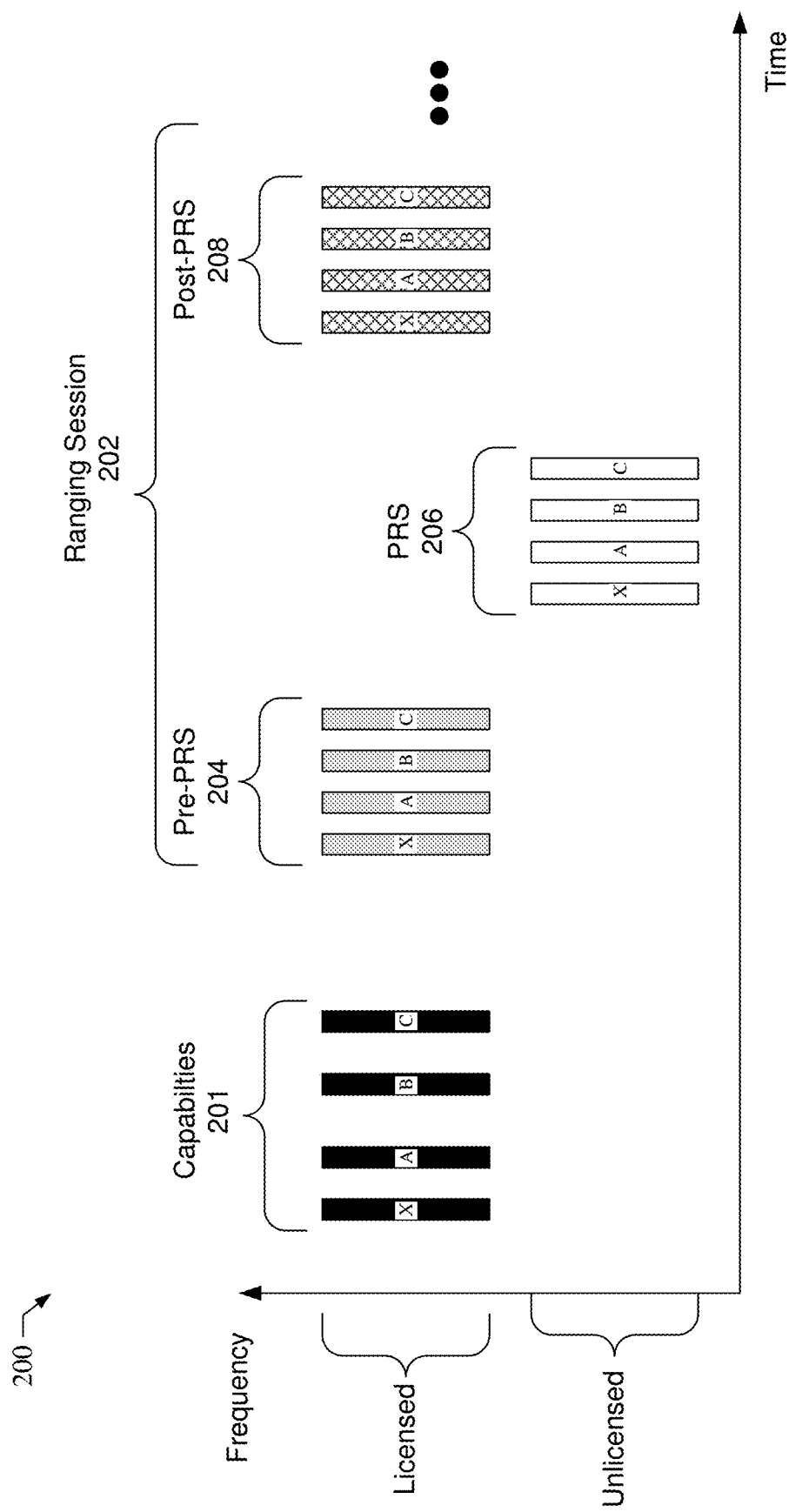
FIG. 2 illustrates a signaling graph indicating the timing and frequencies of various messages that may be sent and received by an initiating UE and three responder UEs for a ranging or positioning session.

FIG. 2 illustrates, by way of example, a signaling graph 200 indicating the timing and frequencies of various messages that may be sent and received by an initiator UE (UEX) and three responder UEs (UEA, UEB, and UEC) for a ranging or positioning session. For example, FIG. 2 illustrates capabilities messages 201 and an RTT-based ranging session 202, during which a number of messages are sent between an initiator UE and responder UEs, including pre-PRS messages 204 to request and accept a ranging session, the PRS signals 208 for measurement, and post-PRS messages 208 to exchange measurement payloads. Each set of pre-PRS 204, PRS 206, and post-PRS 208 may be considered a single unit or PRS cycle. Each PRS cycle includes a pre-PRS message 204, PRS signal 206, and post-PRS message 208, and may therefore be referred to herein as a ranging session 202. The ranging sessions (PRS cycles) may be periodic with a period $T\_r$, and the capabilities messages may be periodic with a period $T\_c$, where $T\_r > T\_c$. In FIG. 2, the signaling from the initiator UEX is labeled with "X," signaling from a first responder UEA is labeled with an "A," signaling from a second responder UEB is labeled with a "B," and signaling from a third responder UEC is labeled with a "C." The signaling from the initiator UEX is the first box in each of the pre-PRS messages 204, the PRS signals 206, and the post-PRS messages 208, and is followed by the responder UEs (UEA, UEB, and UEC).

As illustrated, the UEs, including the initiator UE and responder UEs, may broadcast capabilities messages 201. The capabilities messages are not part of the ranging session but may include information that may be used by the initiator UE to initiate a ranging session with selected UEs. For example, the capabilities message may include the UE ID, the ranging capability of the UE, the channel that the UE is configured to use, etc. The capabilities message may additionally indicate whether the UE needs to determine its position or if its position is known and it may serve as an anchor UE for positioning other UEs. It should be understood that while FIG. 2 illustrates the capabilities messages 201 as having the same order as the messages in the ranging session 202, the order may, in fact, differ.

The pre-PRS messages 204 (e.g., pre-ranging messages) are used by the UEs to request and acknowledge a ranging session. As illustrated, the pre-PRS messages 204 may be transmitted on a licensed spectrum to guarantee reliability. The pre-PRS messages 204 may be broadcast or unicast, e.g., with Radio Resource Control (RRC) connections. The initiator UEX broadcasts an initial pre-PRS message 204 (gray box labeled with X) to indicate the ranging session between the initiator UE and the responder UEs and which may provide information for the ranging session. For example, the pre-PRS message 204 from the initiator UE, may include IDs for participating UEs, i.e., the initiator and responder IDs. The pre-PRS message may include the PRS ID that will be used by the initiator UE, and in some implementations, the PRS ID to be used by the responder UEs. If the PRS ID will be fixed over multiple PRS exchanges (e.g., for multiple units in the ranging session 202), the initiator UE may include an ID associated with the current PRS exchange, e.g., a session ID. The initiator UE may determine when the PRS signals 206 will be transmitted, which, for example, may be configured from an upper layer in the initiator UE. The initiator UE may indicate the timing of the PRS by sending the time slot number nears to the desired PRS transmission time. In some implementations, the time slot may be subject to local clock error. In some implementations, the initiator UE may further provide the timing of PRS to be sent by the responder UEs. The initiator UE may further indicate the frequency that will be used to broadcast the PRS signal 206 by the initiator UE. For example, the frequency of PRS may be selected from an available set of total bandwidths or the frequency of PRS may be selected by sensing the interference and choosing one or more channels whose average interference Reference Signal Receive Power (RSRP) is less than a threshold. The initiator UE may indicate the number of PRS cycles that it will execute during the ranging session 202. The number of PRS cycles may be configured from an upper layer. The pre-PRS message for each PRS cycle, for example, may indicate the current PRS cycle with respect to the total PRS cycles requested, where the number of the current cycle increments after completion of each cycle.

The initial pre-PRS message from the initiator UE is received and decoded by the responder UEs, which are identified in the initial pre-PRS message. The responder UEs may send responding pre-PRS messages 204 (gray boxes labeled with A, B, C) acknowledging the initial pre-PRS message, which may additionally provide information for the ranging session. For example, each responder UE may determine the timing of its PRS signal 206, e.g., based on the PRS timing of the initiator UE plus a delay, which may be based on hardware constraints and the interference level, and the number and order of responder UEs. For example, the delay may be relatively low when the PRS processing time is small and ambient interference is low and may be relatively high when the PRS processing time is high and ambient interference is high. The responder UE may indicate the determined time of its PRS by sending the time slot number nears to the determined PRS transmission time. In some implementations, the time slot may be subject to local clock error. Each responder UE may indicate the PRS ID that it will use or may indicate that it will use the PRS ID that was indicated in the initial pre-PRS message. If the PRS ID will be fixed over multiple PRS exchanges (e.g., multiple PRS cycles in the ranging session 202), the responder UE may include the ID associated with the current PRS exchange, e.g., a session ID, that was received in the initial pre-PRS message from the initiator UE. Each responder UE may further indicate the frequency that will be used to broadcast its PRS signal 206. The responder UEs may broadcast the pre-PRS messages 204, which may be received by the initiator UE (and other responder UEs). In some implementations, each responder UE may transmit the pre-PRS message 204 using unicast with RRC connection to the initiator UE.

The PRS signals 206 are exchanged by the participating UEs. The initiator UE and responder UEs know the expected timing of the PRS signals and know the PRS ID (and any session ID used with the exchanged) as well as the frequency that is used to broadcast the PRS signals 206. The PRS signals 206 may be broadcast on an unlicensed spectrum, which may be subject to LBT constraints. In some implementations, when using the unlicensed spectrum, the initiator UEX may reserve the transmission for responder UEs UEA, UEB, and UEC, so that the responder UEs do not need to perform LBT. For example, the initiator UEX broadcasts its PRS signal 206 (white box labeled with X) at the determined time that was indicated in the initial pre-PRS message 204. In some implementations, the initiator UE broadcasts its PRS signal at the determined time plus a random waiting time due to the LBT constraints when the PRS signal is deployed in the unlicensed spectrum. In some implementations, the LBT may be a Category 2 LBT with a fixed window Clear Channel Assessment (CCA) or a Category 4 LBT with a varying window CCA. The initiator UE uses the PRS signal that corresponds to the PRS ID and uses the frequency resources that were indicated in its initial pre-PRS message 204. The initiator UE saves the time instance that the PRS signal is broadcast, and the responder UEs save the time instance that the PRS signal is received. In some implementations, the time instances may be subject to local clock error.

Similar to the initiator UE, each responder UEs broadcast its PRS signal 206 (white boxes labeled with A, B, and C) at the determined time that was indicated in the initial pre-PRS message 204. at the determined time that it indicated in the pre-PRS message 204 (or that was assigned by the initial UE). In some implementations, each responder UE may broadcast its PRS signal at the determined time plus a random waiting time due to the LBT constraints when the PRS signal is deployed in the unlicensed spectrum. In some implementations, the LBT may be a Category 2 LBT with a fixed window CCA or a Category 4 LBT with a varying window CCA. Each responder UE uses the PRS signal that corresponds to the PRS ID and uses the frequency resources that were indicated in its pre-PRS messages 204. Each responder UE saves the time instance that its PRS signal is broadcast, and the initiator UE (and optionally other responder UEs) save the time instance that the PRS signal is received. In some implementations, the time instances may be subject to local clock error.

Thus, each UE records the time of departure (ToD) of its broadcast PRS signal and measures the time of arrival (ToA) of the PRS signal received from the other UEs. The PRS signal may be any signal suitable for ranging, e.g., as defined for DSRC or C-V2X. The PRS signal, for example, may be a Quadrature Phase Shift Keying (QPSK) modulated pseudo-noise (PN) sequence. The ToA and ToD resolution of the PRS signals increase with an increased frequency bandwidth. In some implementations, the angle of departure (AoD) and angle of arrival (AoA) of the broadcast and received PRS signals may also be measured. Broadcasting on an unlicensed spectrum is advantageous as a wider frequency band is available. For example, in some implementations, PRS may be broadcast on one or more UNII radio bands including, for example, one or more of the UNII-1 radio band, the UNII-2A radio band, the UNII-2B radio band, or the UNII-3 radio band.

The post-PRS messages 208 are sent by each UE to exchange measurement payloads. As illustrated, the post-PRS messages 208 may be transmitted on a licensed spectrum to guarantee reliability. In some implementations, the post-PRS messages 208 may be broadcast or unicast with RRC connection. The initiator UEX sends its post-PRS message 208 (hatched box labeled with X) and indicates when it broadcast the PRS signal 206 (ToD) and when the PRS signals from the responder UEs were received (ToA). In some implementations, the ToA may be computed as a relative time with respect to the ToD of its broadcast PRS signal, and the relative time may be provided. In some implementations, the relative time may be approximated to the closest multiple of time scale shared by the initiator UE and the responder UEs. In some implementations, the initiator UE may provide an indication of its location in the post-PRS message 208, if known. For example, the location of the initiator UE may be the location at a specific time, such as the broadcast time of its PRS signal or the arrival time of the PRS signal from a responder UE. The post-PRS message 208 may further include the orientation of initiator UE, a broadcast indicator of the PRS signal 206, a reception indicator of PRS from the responder UEs, as well as other related measurements, e.g., including map information, the locations of reflectors with respect to the UE, etc.

Similar to the initiator UE, each responder UEs sends its post-PRS signal 208 (hatched boxes labeled with A, B, C) to provide the measurement payloads. Each responder UE may indicate whether it received the PRS signal from the initiator UE and may indicate when it broadcast the PRS signal 206 (ToD) and when the PRS signals from the initial UE (and optionally from other responder UEs) was received (ToA). In some implementations, the ToD may be computed as a relative time with respect to the ToA of the PRS signal from the initiator UE (and optionally with respect to the ToA of the PRS from other responder UEs). In some implementations, the relative time may be approximated to the closest multiple of time scale shared by the initiator UE and the responder UE. In some implementations, the responder UE may provide an indication of its location in the post-PRS message 208, if known. For example, the location of the responder UE provided may be the location at a specific time, such as the arrival time of PRS signal from the initiator UE or the departure time of its broadcast PRS signal. The post-PRS message 208 may further include the orientation of initiator UE, a broadcast indicator of the PRS signal 206, a reception indicator of PRS from the responder UEs, as well as other related measurements, e.g., including map information, the locations of reflectors with respect to the UE, etc.

After receiving the post-PRS messages, the initiator UE may compute its range (and in some implementations its location), e.g., using a Kalman filter, and then may transmit the next cycle of pre-PRS messages at a time that is indicated by an upper layer or that is autonomously determined by the initiator UE.

The time between the first pre-PRS message 204 and the last post-PRS message 208 may be the duration of the ranging session and may be, e.g., 100 msec. In some implementations, multiple PRS cycles, e.g., multiple instances of pre-PRS messages 204, PRS 206, and post-PRS messages 208, may be used together to provide higher accuracy.

Both the initiator UE and the responder UEs may determine the range between itself and each other UE in the ranging session based on the ToD and the ToA of the broadcast PRS signals. For example, the RTT between any pair of UEs (which may be any pair of initiator and responder UEs) may be determined based on the $ToD_i$ and $ToA_i$ for the $PRS_i$ signals (where i=1 for PRS broadcast from a first UE and i=2 for PRS broadcast by a second UE), as the difference between the $ToD_1$ and $ToA_2$ minus the difference between the $ToA_1$ and the $ToD_2$, e.g., as follows.

$$RTT=(ToD_1-ToA_2)-(ToA_1-ToD_2) \qquad \text{eq. 1}$$

The RTT value is the round-trip time for the signal, and thus, the range (distance) between the $UE_1$ and $UE_2$ may be determined as RTT/2c, where c is the speed of light.

If the position of one or more responder UEs is known, the range between the initiator UE and the responder UEs may be used along with the known position of the one of the responder UE to determine the position of the other UE, and thus, the ranging session may be a positioning session. The responder UEs with known positions that may be used for positioning may sometimes be referred to herein as anchor UEs. The positions of anchor UEs may be provided to other UEs through messaging, e.g., in the pre-PRS messages or in the post-PRS messages. If the range to multiple anchor UEs is determined, the positions of the multiple anchor UEs may be used in multilateration to determine the position of the initiator UE (or other responder UEs).

The angle measurements, e.g., AoD, and AoA, may be used, e.g., for assistance in positioning. By way of example, based on the range between two UEs and a measured AoA, the relative positions of the two UEs may be determined. With the relative positions of the UEs determined, if the actual position of one of the UEs is known (which may be provided, e.g., in the pre-PRS messages 204 or post-PRS messages 208), the actual position of the other UE may be determined. If the position of two UEs are known by a third UE, the ranges between the third UE and each of the other two UEs will produce two possible positions for the third UE, which may be resolved based on AoD/AoA information. The AoD may be useful if the resolution of the AoA is poor or incorrect, for example. AoD may be measured, e.g., based on a known orientation of the UE (for example, determined by a magnetometer), and the direction of the transmitted signal relative to the UE (e.g., relative to an antenna array of the UE used for beamforming). The AoA may be measured based on the phase difference of a received signal at different antenna elements of an antenna array and the known orientation of the UE, for example determined by a magnetometer). Additionally, geographic constraints may be used to assist in positioning, for example, by constraining possible positions of a vehicle based on positions that are accessible to a vehicle, such as a road.

As discussed above, due to the distributed mechanism for ranging, it is possible that multiple UEs may initiate independent ranging sessions that include at least some of the same responder UEs at approximately the same time. For example, two initiating UEs may separately broadcast their own pre-PRS signals to the same set of responder UEs resulting in two independent ranging sessions that include the same responder UEs and that occur at the same time. By way of illustration, two vehicles may be approaching or stopped at an intersection and V-UEs associated with each vehicle may initiate uncoordinated ranging sessions with a number of anchor UEs, e.g., RSUs and/or V-UEs or pedestrian held UE with known accurate locations, that are located near the intersection. Likewise, a pedestrian held UE may initiate an uncoordinated ranging session with the anchor UEs near the intersection. It is desirable to combine the uncoordinated ranging sessions of multiple UEs into a single combined ranging session. A combined ranging session may significantly improve the accuracy of ranging/positioning of each UE, e.g. by reducing the number of overhead messages on the licensed spectrum, e.g., pre-ranging messages and post-ranging messages, and by increasing the chances of PRS transmission on the unlicensed spectrum.

Figure 3:
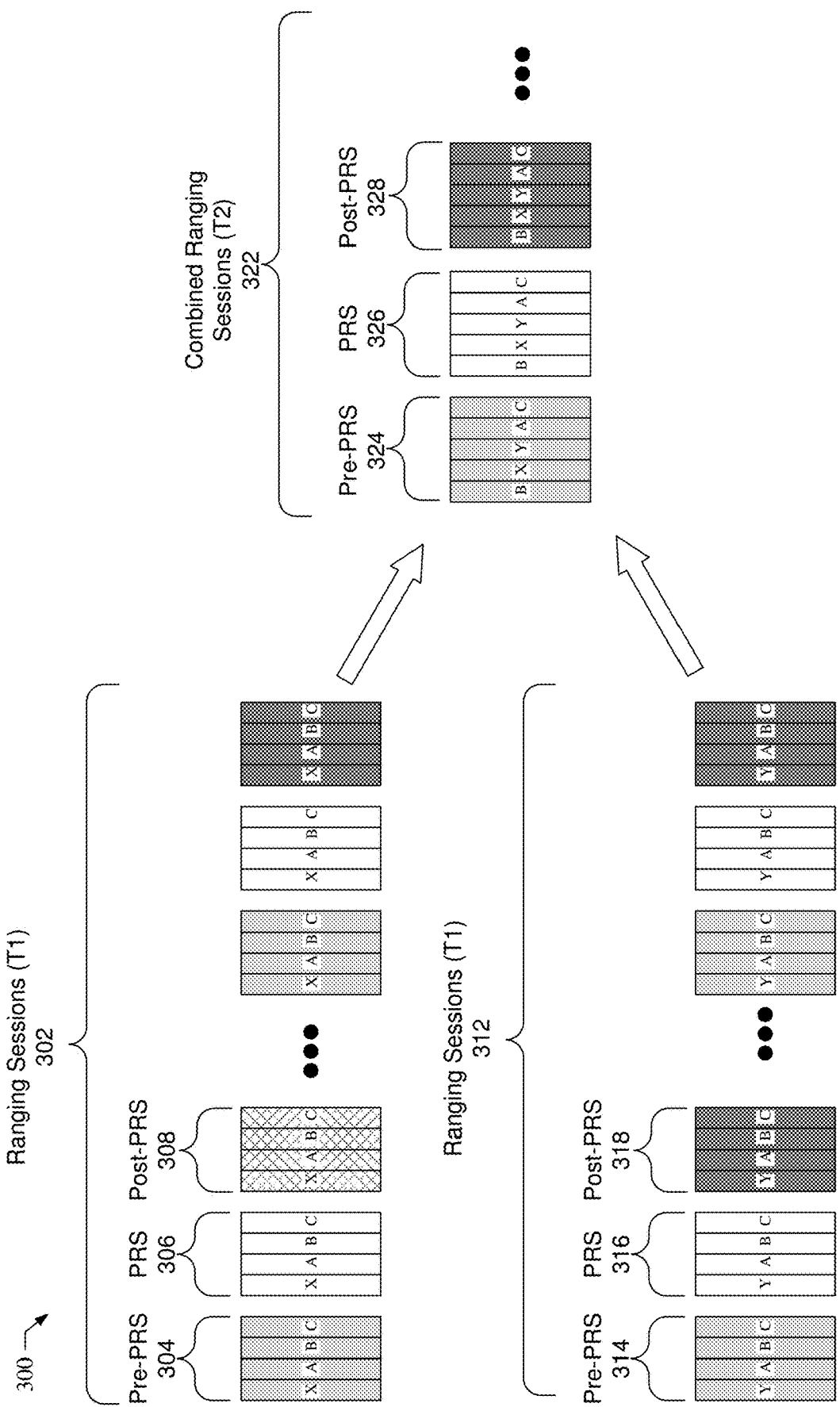
FIG. 3 illustrates a graph showing two individual ranging sessions that are combined into a single combined ranging session that includes all participating UEs from the individual ranging sessions.

FIG. 3, by way of example, illustrates a graph 300 showing two separate sets of ranging sessions 302 and 302 that may be separately initiated by initiator UEs (UEX and UEY) and each ranging session 302 and 312 includes the same responder UEs (UEA, UEB, and UEC), which may be anchor UEs, such as stationary RSU UEs or may be mobile, such as a V-UE or pedestrian UE with a known accurate position (e.g., from a satellite positioning system (SPS). Similar to FIG. 2, each ranging session 302 and 312 (i.e., PRS cycle) includes pre-ranging messages (pre-PRS messages 304 and 314 shown with gray boxes), ranging signals (PRS signals 306 and 316 shown with white boxes), and post-ranging messages (post-PRS messages 308 and 318 shown with hatched boxes). The signaling from the initiator UEs (UEX and UEY) is the first box in each of the pre-PRS messages 304 and 314, the PRS signals 306 and 316, and the post-PRS messages 308 and 318, and is followed by the responder UEs (UEA, UEB, and UEC). Also, similar to FIG. 2, the signaling from the initiator UEX is labeled with "X," signaling from the initiator UEY is labeled with "Y," signaling from a first responder UEA is labeled with an "A," signaling from a second responder UEB is labeled with a "B," and signaling from a third responder UEC is labeled with a "C."

During the ranging sessions 302 and 312, a responder UE (e.g., UEB) may monitor ranging sessions. For example, responder UEB may be an anchor UE, such as an RSU or V-UE or pedestrian held UE with a known accurate location, e.g. from an SPS system, which the responder UEB provides to the initiating UEX, e.g., in post-PRS messages 308 and provides to the initiating UEY, e.g., in the post-PRS message 318. The initiating UEs (UEX and UEY) may perform ranging with the responder UEs and positioning with the location of anchor UEs, such as UEB.

The responder UEB may decode the periodic broadcast of the pre-ranging messages (pre-PRS messages 304) in each ranging session from each and every initiator UE, e.g., initiator UEX and initiator UEY, for a period of time, e.g., T1 seconds. From the pre-PRS messages 304, the responder UEB determines the UE specific identifiers for the initiator UEs (UEX and UEY), as well as responder UEs included in their corresponding ranging sessions (UEB, UEB, and UEC). In the example illustrated in FIG. 3, the ranging sessions 302 and 312 share exactly the same responder UEs, but in practice, one or both ranging sessions 302 and 312 may include responder UEs that are not included in the other ranging session. Thus, the responder UEB identifies the UEs that are participating in each ranging session, e.g., based on the information provided in the pre-PRS messages.

Additionally, in some implementations, the responder UEB may determine the speed at which the initiator UEs (UEX and UEY) are traveling. For example, in one implementation, the initiator UEs may provide their speeds in pre-PRS messages 304 or post-PRS messages 308. In another implementation, the responder UEB may determine the change in the position of the initiator UE over a period of time to determine the speed. The initiator UEs may provide their positions in post-PRS messages 308 or the responder UEB may determine their positions from the ranging position. In another implementation, the responder UE may determine the change in the range to an initiator UE over a period of time, which may provide an indication of the speed at which the initiator UE is travelling. The responder UEB, for example, may determine the average speed for the initiator UEs, or another statistical measure of the speeds.

The period of time T1 that responder UEB monitors the ranging sessions 302 and 312 may be based on the speed of the initiator UEs. For example, if the speed of the initiator UEs (UEX and UEY) is relatively slow (such as the initiator UEs are stopped at an intersection or are in heavy traffic), the responder UEB may monitor the ranging sessions 302 and 312 for an extended time, i.e., the period of time T1 may be relatively long, while if the speed of the initiator UEs (UEX and UEY) is relatively fast (such as the initiator UEs are traveling through the intersection or are in light traffic), the responder UEB may monitor the ranging sessions 302 and 312 for a shorter time, i.e., the period of time T1 may be relatively short. In one implementation, for example, if the average speed of the initiator UEs is greater than a threshold speed, the period of time T1 may be decreased from a default period of time. Conversely, if the average speed of the initiator UEs is less than the threshold speed, the period of time T1 may be increased from the default period of time. In some examples, the amount of the decreased or increase from the default period of time may be based on the difference between the average speed and the predetermined threshold speed, or multiple threshold speeds may be used. In one implementation, additional or other factors may be used to determine the duration of the period of time T1. By way of example, environmental parameters may be considered when determining the duration of the period of time T1, such as whether the traffic control light in the area of the initiator UEs is red or green (e.g., where the monitoring period T1 may be increased if the initiator UEs are stopped at the intersection by a red light or the monitoring period T1 may be decreased if the initiator UEs are traveling through the intersection with a green light.

The UEB may become an initiator UE and may initiate a combined ranging session 322 that includes all of the UEs that participated in the ranging sessions 302 and 312. Each combined ranging session 322 (i.e., PRS cycle) includes pre-ranging messages (pre-PRS messages 324 shown with gray boxes), ranging signals (PRS signals 326 shown with white boxes), and post-ranging messages (post-PRS messages 328 shown with hatched boxes). The signaling from the new initiator UEB, thus, appears as the first box in each of the pre-PRS messages 324, the PRS signals 326, and the post-PRS messages 328, followed by the responder UEs (UEX, UEY, UEA, and UEC).

The original initiator UEs (UEX and UEY) from ranging sessions 302 and 312 receive and decode the broadcast of the pre-PRS message 324 from the new initiator UEB. The original initiator UEs (UEX and UEY), for example, may terminate initiation of ranging sessions 302 and 312 when they are identified as responder UEs in the combined ranging session 322, along with UEs that were responder UEs in the original ranging sessions 302 and 312. In another implementation, the new initiator UEB may include an indication in the pre-PRS message 324 that the original initiator UES are to terminate initiation of their independent ranging sessions or may send such an indication in a separate V2X message to the initiator UEs.

The original initiator UEs (UEX and UEY) function as responder UEs during the combined ranging session 322 and continue to perform their ranging (and positioning) determinations. The new initiator UEB may continue initiating combined ranging session 322 for a period of time, e.g., T2 seconds. After the period of time T2, the new initiator UEB terminates the initiation of the combined ranging sessions 322 and the original initiator UEs (UEX and UEY) may begin initiating their independent ranging sessions again, which may include the same or different sets of responder UEs. In some implementations, the initiator UEs (UEX and UEY) may begin initiating their independent ranging sessions when the new initiator UEB terminates broadcasting pre-PRS messages for the combined ranging session 322. Alternatively, the new initiator UEB may provide an indication of the period of time T2 or the time remaining in the period of time T2, e.g., in the pre-PRS messages or a separate V2X message to the initiator UEs, and the original initiator UEs (UEX and UEY) may use the expiration of the period of time T2 as a trigger to begin initiating independent ranging sessions again.

The period of time T2 for the combined ranging session 322 may be based on the speed of the initiator UEs, similar to the period of time T1, discussed above. For example, if the speed of the initiator UEs (UEX and UEY) is relatively slow (such as the initiator UEs are stopped at an intersection or are in heavy traffic), the new initiator UEB may initiate the combined ranging session 332 for an extended time, i.e., the period of time T2 may be relatively long, while if the speed of the initiator UEs (UEX and UEY) is relatively fast (such as the initiator UEs are traveling through the intersection or are in light traffic), the responder UEB may initiate the combined ranging session 332 for a shorter time, i.e., the period of time T2 may be relatively short. In one implementation, for example, if the average speed of the initiator UEs is greater than a threshold speed, the period of time T2 may be decreased from a default period of time. Conversely, if the average speed of the initiator UEs is less than the threshold speed, the period of time T2 may be increased from the default period of time. In some examples, the amount of the decreased or increase from the default period of time may be based on the difference between the average speed and the predetermined threshold speed, or multiple threshold speeds may be used. In one implementation, additional or other factors may be used to determine the duration of the period of time T2. By way of example, environmental parameters may be considered when determining the duration of the period of time T2, such as whether the traffic control light in the area of the initiator UEs is red or green (e.g., where the combined ranging session period T2 may be increased if the initiator UEs are stopped at the intersection by a red light or the combined ranging session period T2 may be decreased if the initiator UEs are traveling through the intersection with a green light.

By monitoring multiple ranging sessions and combining the ranging sessions into a single combined ranging session the total number of pre-PRS messages, PRS signals, and post-PRS messages may be significantly reduced. Moreover, the number of PRS transmissions on the unlicensed spectrum may be reduced, which increases the chances of successful PRS transmission for each UE.

Figure 4:
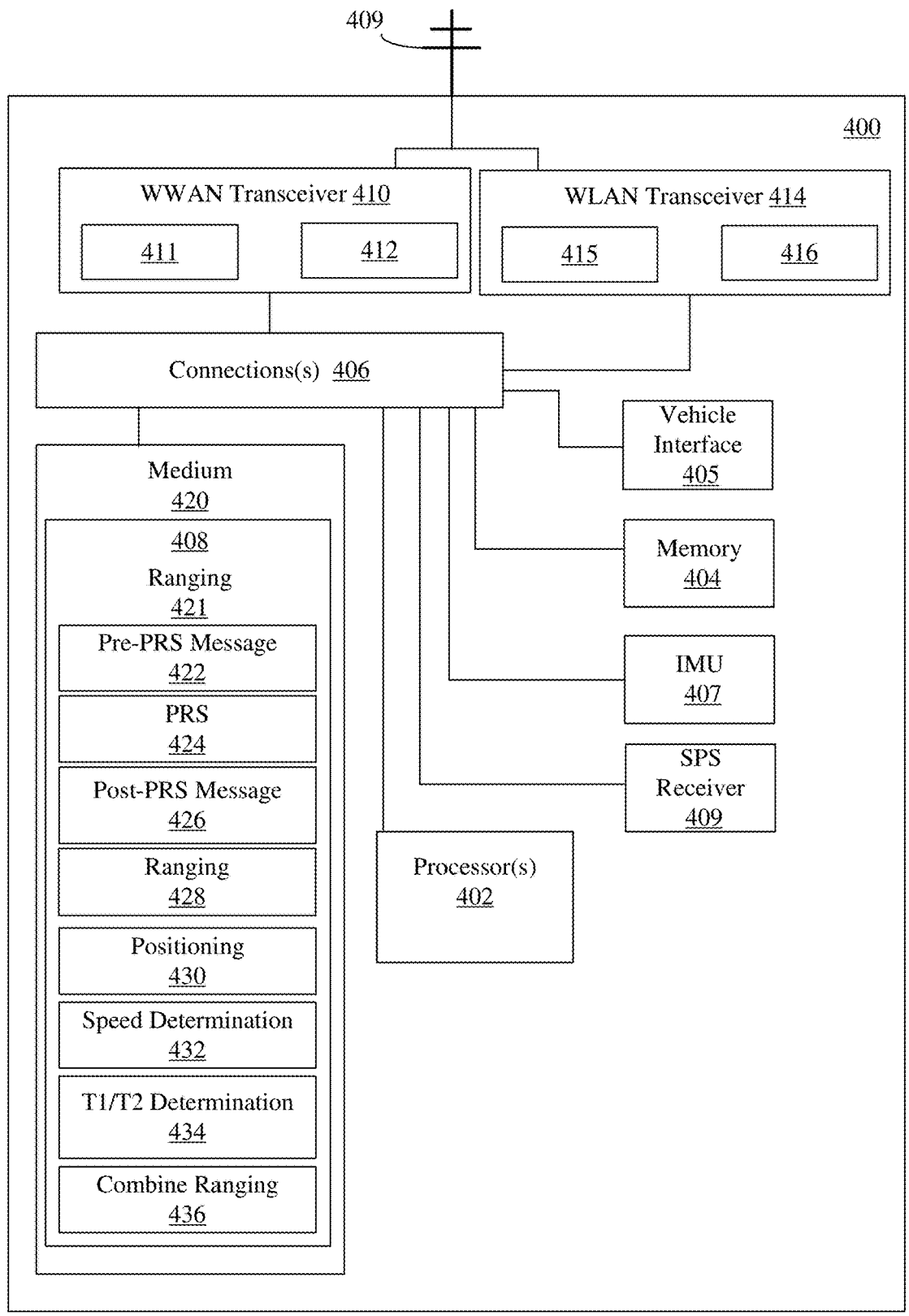
FIG. 4 shows a schematic block diagram illustrating certain exemplary features of a UE configured for combining independent ranging sessions into a single ranging session.

FIG. 4 shows a schematic block diagram illustrating certain exemplary features of a user equipment (UE) 400, which may be UE in vehicles 102 or 104, an RSU 110, or UE 112 held by a pedestrian 114, as illustrated in FIG. 1, or any UE illustrated in FIG. 3. The UE 400 may be configured to act as an initiator UE or a responder UE during ranging sessions that are combined into a single combined ranging session to reduce signaling overhead and improve efficiency, as discussed herein. If the UE 400 is a V-UE, it may be configured to control the automated driving of a vehicle, e.g., vehicle 102. For example, the UE 400 may include a vehicle interface 405 with which commands are provided to the vehicle for automated driving and sensory input, including speed and acceleration, may be provided from the vehicle to UE 400. The UE 400 may, for example, include one or more processors 402, memory 404, an inertial measurement unit (IMU) 407 that may include, e.g., an accelerometer, gyroscope, magnetometers, etc., which may be used to detect orientation with respect to a global or local reference frame and the motion or one or more motion characteristics of the vehicle, a satellite positioning system (SPS) receiver 409 to determine, e.g., a GPS position, and an external interface including, e.g., a Wireless Wide Area Network (WWAN) transceiver 410, and a Wireless Local Area Network (WLAN) transceiver 414, which may be operatively coupled with one or more connections 406 (e.g., buses, lines, fibers, links, etc.) to non-transitory computer readable medium 420 and memory 404. The UE 400 may further include additional items, which are not shown, such as a user interface that may include e.g., a display, a keypad or other input device, such as virtual keypad on the display, through which a user may interface with the user device. In certain example implementations, all or part of UE 400 may take the form of a chipset, and/or the like.

Transceiver 410 may be, e.g., a cellular transceiver, that is configured to transmit and receive direct communications in the wireless network, as illustrated in FIG. 1. The transceiver 410 may include a transmitter 411 enabled to transmit one or more signals over one or more types of wireless communication networks and a receiver 412 to receive one or more signals transmitted over the one or more types of wireless communication networks. Transceiver 414 may be, e.g., a short-range transceiver, and may be configured to transmit and receive direct communications in the wireless network, as illustrated in FIG. 1. The transceiver 414 may include a transmitter 415 enabled to transmit one or more signals, including ranging signals (PRS signals) and pre-ranging (pre-PRS) and post-ranging (post-PRS) messages, and combine and separate messages, over one or more types of wireless communication networks and a receiver 416 to receive one or more signals, e.g., including PRS and pre-PRS and post-PRS messages, combine and separate messages, transmitted over the one or more types of wireless communication networks. The transceivers 410 and 414 enable the UE 400 to communicate with transportation entities using D2D communication links, such as DSRC, C-V2X, or 5G NR.

In some embodiments, UE 400 may include antenna 409, which may be internal or external. The antenna 409 may be used to transmit and/or receive signals processed by transceiver 410 and/or transceiver 414. In some embodiments, antenna 409 may be coupled to transceiver 410 and/or transceiver 414. In some embodiments, measurements of signals received (transmitted) by UE 400 may be performed at the point of connection of the antenna 409 and transceiver 410 and/or transceiver 414. For example, the measurement point of reference for received (transmitted) RF signal measurements may be an input (output) terminal of the receivers 412, 416 (transmitters 411, 415) and an output (input) terminal of the antenna 409. In a UE 400 with multiple antennas 409 or antenna arrays, the antenna connector may be viewed as a virtual point representing the aggregate output (input) of multiple antennas. The phase difference of received signals at multiple antennas or antenna array may be used to determine the AoA of the signal with respect to the antenna array, which may be converted to a local or global reference frame based on a known orientation of the UE 400, e.g., based on the orientation of the UE 400 to the global or local reference frame as measured by the IMU 407.

The one or more processors 402 may be implemented using a combination of hardware, firmware, and software. For example, the one or more processors 402 may be configured to perform the functions discussed herein by implementing one or more instructions or program code 408 on a non-transitory computer readable medium, such as medium 420 and/or memory 404. In some embodiments, the one or more processors 402 may represent one or more circuits configurable to perform at least a portion of a data signal computing procedure or process related to the operation of UE 400.

The medium 420 and/or memory 404 may store instructions or program code 408 that contain executable code or software instructions that when executed by the one or more processors 402 cause the one or more processors 402 to operate as a special purpose computer programmed to perform the techniques disclosed herein. As illustrated in UE 400, the medium 420 and/or memory 404 may include one or more components or modules that may be implemented by the one or more processors 402 to perform the methodologies described herein. While the components or modules are illustrated as software in medium 420 that is executable by the one or more processors 402, it should be understood that the components or modules may be stored in memory 404 or may be dedicated hardware either in the one or more processors 402 or off the processors.

A number of software modules and data tables may reside in the medium 420 and/or memory 404 and be utilized by the one or more processors 402 in order to manage both communications and the functionality described herein. It should be appreciated that the organization of the contents of the medium 420 and/or memory 404 as shown in UE 400 is merely exemplary, and as such the functionality of the modules and/or data structures may be combined, separated, and/or be structured in different ways depending upon the implementation of the UE 400.

The medium 420 and/or memory 404 may include a ranging module 421 that when implemented by the one or more processors 402 configures the one or more processors 402 to participate in a ranging session as an initiator UE or a responder UE as discussed herein. The ranging module 421, for example, may include a pre-ranging module (pre-PRS message module 422), a ranging signal module (PRS module 424), a post-ranging module (post-PRS message module 426), and a range module 428.

The medium 420 and/or memory 404 may include a pre-PRS message module 422 that when implemented by the one or more processors 402 configures the one or more processors 402 to generate and transmit or receive pre-ranging messages, such as pre-PRS messages, via the transceiver 414, e.g., to initiate a ranging session or to accept a ranging session. The pre-PRS messages may be broadcast, multicast, or unicast (with RRC connection). In some implementations, the PRS messages may be transmitted and received over a licensed spectrum. The pre-PRS message may be an initiating pre-PRS message to initiate a ranging session or a responding pre-PRS message to acknowledge an initiating pre-PRS message. The pre-PRS messages may include identifiers for the initiating UE and one or more responder UEs for the positioning session, which may be monitored by the UE 400 over a plurality of ranging sessions. The participating UEs may be determined, e.g., from capabilities messages received by the UE 400 or from monitoring pre-PRS messages broadcast by multiple initiator UEs over a period of time. In some implementations, e.g., if a combined ranging session is being initiated, the pre-PRS message received by the UE 400 may include an indication that the UE 400 is to terminate initiation of ranging sessions and that the UE 400 is a responder in a new ranging session, e.g., a combined ranging session. In some implementations, the indication may be provided in a separate, e.g., V2X, message. Additionally, in some implementations, a period of time (T2) may be included in the pre-PRS message that indicates the duration of the combined ranging sessions, and at the expiration of the period of time, the combined ranging session will terminate and separate ranging sessions may be initiated. The pre-PRS messages may further include ranging signal properties to be used in a ranging session. For example, the pre-PRS message may include an identifier for the ranging signal and timing information (e.g., time slot number) of the ranging signal and frequency that will be used to broadcast the ranging signal. The frequency, for example, may be selected from an available set of bandwidths, and may be selected by sensing interference and choosing a channel with an average interference RSRP that is less than a threshold. In some implementations, an initiating pre-PRS message may include an indication of the number of PRS cycles requested and the current PRS cycle.

The medium 420 and/or memory 404 may include a PRS module 424 that when implemented by the one or more processors 402 configures the one or more processors 402 to broadcast and receive a ranging signal to and from other UEs in the ranging session, via the transceiver 414, as discussed herein. The ranging signal, for example, may be a PRS signal, such as a Quadrature Phase Shift Keying (QPSK) modulated pseudo-noise (PN) sequence as discussed herein. The ranging signal may be broadcast at the determined time and with the identifier and at the frequencies indicated over the pre-PRS message. The ranging signal may be broadcast and received over unlicensed spectrum and may be broadcast pursuant to category 2 or category 4 LBT constraints. The one or more processors 402, for example, may be configured to measure the ToD of broadcast ranging signals and the ToA of received ranging signals, and may be configured to measure the AoD of broadcast ranging signals and the AoA of received ranging signals.

The medium 420 and/or memory 404 may include a post-PRS message module 426 that when implemented by the one or more processors 402 configures the one or more processors 402 to send and receive post-ranging messages to and from other UEs in the ranging session, via the transceiver 414, as discussed herein. The post-PRS messages that may include, e.g., an indication of the ToD, and in some implementations the AoD, of the broadcast ranging signals and an indication of the ToA, and in some implementations the AoA, of the received ranging signals. In some implementation, the indication of the ToD and ToA may be a difference between the ToD and ToA. In some implementations, the post-PRS messages may include an indication of the position of the UE, e.g., if the UE is an anchor UE used for positioning another UE.

The medium 420 and/or memory 404 may include a range module 428 that when implemented by the one or more processors 402 configures the one or more processors 402 to determine a range to other UEs based on the ToD and ToA of broadcast and received ranging signals as measured by the UE 400 and received in the post-PRS messages from other UEs.

The medium 420 and/or memory 404 may include a position module 430 that when implemented by the one or more processors 402 configures the one or more processors 402 to determine a position for the UE 400, e.g., based on one or more ranges to broadcasting UEs and their location information using multilateration or other appropriate techniques discussed herein. For example, the one or more processors 402 may implement a Kalman filter or Extended Kalman filter to determine the position of the UE 400.

The medium 420 and/or memory 404 may include a speed determination module 432 that when implemented by the one or more processors 402 configures the one or more processors 402 to determine speeds of other UEs, e.g., UEs that are initiating ranging sessions. The speed of other UEs may be determined, e.g., in one implementation, the one or more processors 402 may be configured to receive an indication of the speeds of the UEs, e.g., in pre-PRS messages or post-PRS messages, received via the transceiver 414. The one or more processors 402 may be configured to determine the speed of another UE based on a change in position of the UE (where positions of the other UE may be received in post-PRS messages via the transceiver 414) over a period of time. The one or more processors 402 may be configured to determine the speed of another UE based on a change in range to the other UE over a period of time. The one or more processors 402 may be configured to determine an average of the speeds of initiator UEs or other statistically relevant combination of speeds.

The medium 420 and/or memory 404 may include a T1/T2 determination module 434 that when implemented by the one or more processors 402 configures the one or more processors 402 to determine the period of times to monitor a number of independent ranging sessions (period of T1) and perform combined ranging sessions (period of time T2). The period of times T1 and T2, for example, may be based on the speed of the initiator UEs. For example, if the average speed of the initiator UEs is greater than a predetermined threshold, the period of times T1 and T2 may be decreased and conversely, if the average speed of the initiator UEs is less than the predetermined threshold, the period of times T1 and T2 may be increased. The amount of increase and/or decrease may differ for the period of times T1 and T2 and may vary based on the difference between the average speed and the threshold, or multiple thresholds may be used.

The medium 420 and/or memory 404 may include a combine ranging module 436 that when implemented by the one or more processors 402 configures the one or more processors 402 to engage in a combined ranging session, e.g., to initiate a combined ranging session after monitoring multiple independent ranging sessions and determining the participating UEs in each ranging session. The combined ranging session is initiated, e.g., via pre-PRS messages, with all of the UEs that participated in the independent ranging sessions. The one or more processors 402 may be further configured to initiate combined ranging sessions for the period of time T2, and after expiration of the period of time T2, to terminate the initiation of the combined ranging sessions.

The methodologies described herein may be implemented by various means depending upon the application. For example, these methodologies may be implemented in hardware, firmware, software, or any combination thereof. For a hardware implementation, the one or more processors 402 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented with modules (e.g., procedures, functions, and so on) that perform the functions described herein. Any machine readable medium tangibly embodying instructions may be used in implementing the methodologies described herein. For example, software codes may be stored in a non-transitory computer readable medium 420 or memory 404 that is connected to and executed by the one or more processors 402. Memory may be implemented within the one or more processors or external to the one or more processors. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or program code 408 on a non-transitory computer readable medium, such as medium 420 and/or memory 404. Examples include computer readable media encoded with a data structure and computer readable media encoded with a computer program 408. For example, the non-transitory computer readable medium including program code 408 stored thereon may include program code 408 to support monitoring multiple ranging sessions and combining the ranging sessions into a single combined ranging session, in a manner consistent with disclosed embodiments. Non-transitory computer readable medium 420 includes physical computer storage media. A storage medium may be any available medium that can be accessed by a computer. By way of example, and not limitation, such non-transitory computer readable media can comprise RAM, ROM, EEPROM, CD-ROM or other optical disk storage, magnetic disk storage or other magnetic storage devices, or any other medium that can be used to store desired program code 408 in the form of instructions or data structures and that can be accessed by a computer; disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer readable media.

In addition to storage on computer readable medium 420, instructions and/or data may be provided as signals on transmission media included in a communication apparatus. For example, a communication apparatus may include a transceiver 410 having signals indicative of instructions and data. The instructions and data are configured to cause one or more processors to implement the functions outlined in the claims. That is, the communication apparatus includes transmission media with signals indicative of information to perform disclosed functions.

Memory 404 may represent any data storage mechanism. Memory 404 may include, for example, a primary memory and/or a secondary memory. Primary memory may include, for example, a random-access memory, read only memory, etc. While illustrated in this example as being separate from one or more processors 402, it should be understood that all or part of a primary memory may be provided within or otherwise co-located/coupled with the one or more processors 402. Secondary memory may include, for example, the same or similar type of memory as primary memory and/or one or more data storage devices or systems, such as, for example, a disk drive, an optical disc drive, a tape drive, a solid-state memory drive, etc.

In certain implementations, secondary memory may be operatively receptive of, or otherwise configurable to couple to a non-transitory computer readable medium 420. As such, in certain example implementations, the methods and/or apparatuses presented herein may take the form in whole or part of a computer readable medium 420 that may include computer implementable code 408 stored thereon, which if executed by one or more processors 402 may be operatively enabled to perform all or portions of the example operations as described herein. Computer readable medium 420 may be a part of memory 404.

Figure 5:
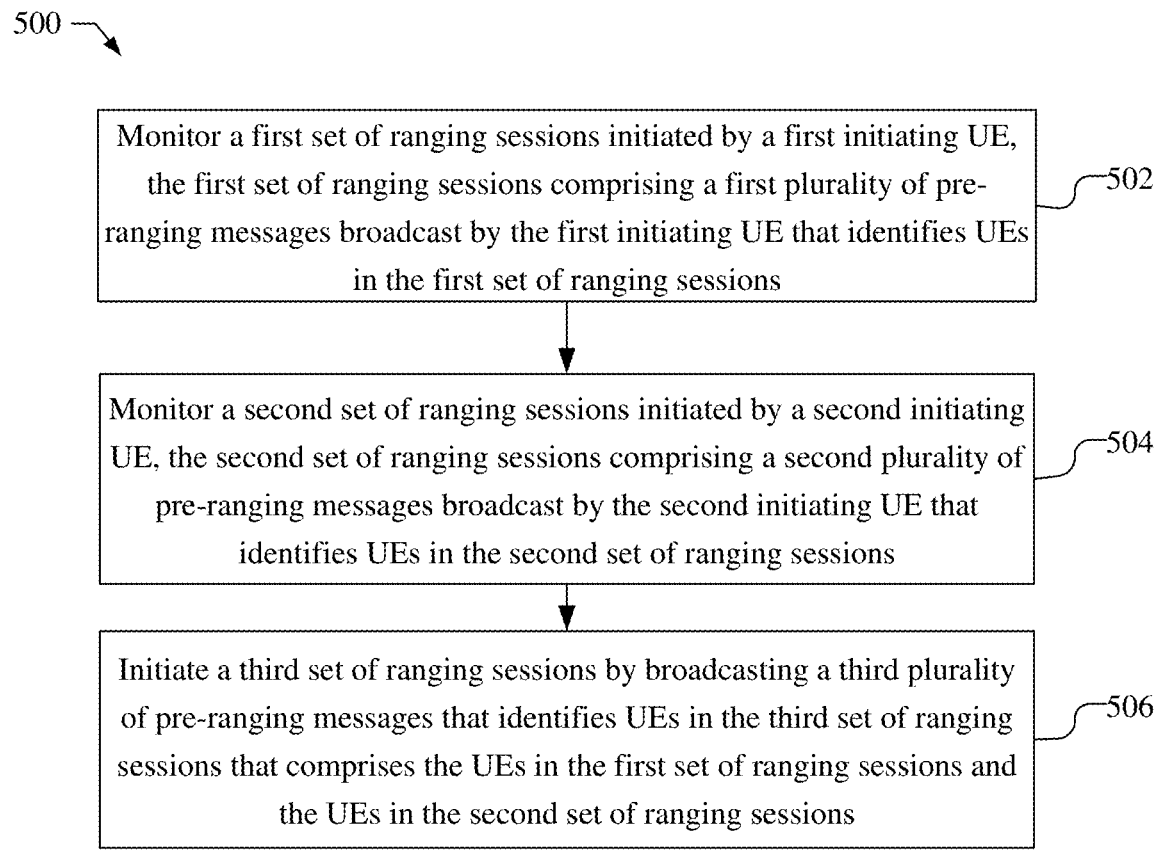
FIG. 5 is a flow chart illustrating a method of ranging between UEs.

FIG. 5 is a flow chart 500 illustrating a method of ranging performed by a first user equipment (UE) in a distributed system of UEs. The first UE, for example, may be similar to the UEB in FIG. 3 or UE 400 in FIG. 4.

At block 502, the first UE monitors a first set of ranging sessions initiated by a first initiating UE, the first set of ranging sessions comprising a first plurality of pre-ranging messages broadcast by the first initiating UE that identifies UEs in the first set of ranging sessions, such as discussed in reference to ranging sessions 302 in FIG. 3. A means for monitoring a first set of ranging sessions initiated by a first initiating UE, the first set of ranging sessions comprising a first plurality of pre-ranging messages broadcast by the first initiating UE that identifies UEs in the first set of ranging sessions may be, e.g., the transceiver 414 and the one or more processors 402 with dedicated hardware or implementing executable code or software instructions in memory 404 and/or medium 420, such as the ranging module 421 and the pre-PRS message module 422.

At block 504, the first UE monitors a second set of ranging sessions initiated by a second initiating UE, the second set of ranging sessions comprising a second plurality of pre-ranging messages broadcast by the second initiating UE that identifies UEs in the second set of ranging sessions, such as discussed in reference to ranging sessions 312 in FIG. 3. A means for monitoring a second set of ranging sessions initiated by a second initiating UE, the second set of ranging sessions comprising a second plurality of pre-ranging messages broadcast by the second initiating UE that identifies UEs in the second set of ranging sessions may be, e.g., the transceiver 414 and the one or more processors 402 with dedicated hardware or implementing executable code or software instructions in memory 404 and/or medium 420, such as the ranging module 421 and the pre-PRS message module 422.

At block 506, the first UE initiates a third set of ranging sessions by broadcasting a third plurality of pre-ranging messages that identifies UEs in the third set of ranging sessions that comprises the UEs in the first set of ranging sessions and the UEs in the second set of ranging sessions, such as discussed in reference to combined ranging sessions 322 in FIG. 3. The first set of ranging sessions and the second set of ranging sessions, for example, are terminated in response to the initiation of the third set of ranging sessions, e.g., as discussed in reference to combined ranging sessions 322 in FIG. 3. A means for initiating a third set of ranging sessions by broadcasting a third plurality of pre-ranging messages that identifies UEs in the third set of ranging sessions that comprises the UEs in the first set of ranging sessions and the UEs in the second set of ranging sessions may be, e.g., the transceiver 414 and the one or more processors 402 with dedicated hardware or implementing executable code or software instructions in memory 404 and/or medium 420, such as the combine ranging module 436, the ranging module 421 and the pre-PRS message module 422.

The first UE, for example, may be an anchor UE with a known position that the first UE provides to the first initiating UE and the second initiating UE for positioning, e.g., discussed in reference to post-PRS messages 308 and 318 in ranging sessions 302 and 312.

In one implementation, the first UE may determine speeds of the first initiating UE and the second initiating UE while monitoring the first ranging session and the second ranging session, e.g., as discussed in reference to ranging sessions 302 and 312 in FIG. 3. A means for determining speeds of the first initiating UE and the second initiating UE while monitoring the first ranging session and the second ranging session may be, e.g., the transceiver 414 and the one or more processors 402 with dedicated hardware or implementing executable code or software instructions in memory 404 and/or medium 420, such as the speed determination module 432. The first set of ranging sessions and the second set of ranging sessions may be monitored for a first period of time, and the third set of ranging sessions may be performed for a second period of time, wherein the first period of time and the second period of time are based on speeds of the first initiating UE and the second initiating UE, e.g., as discussed in reference to ranging sessions 302 and 312 in FIG. 3. The first UE, for example, may decrease the first period of time when an average speed of the first initiating UE and the second initiating UE is greater than a threshold and may increase the first period of time when the average speed of the first initiating UE and the second initiating UE is less than the threshold, e.g., as discussed in reference to ranging sessions 302 and 312 in FIG. 3. The first UE may further decrease the second period of time when the average speed of the first initiating UE and the second initiating UE is greater than the threshold and may further increase the second period of time when the average speed of the first initiating UE and the second initiating UE is less than the threshold, e.g., as discussed in reference to combined ranging session 322 in FIG. 3. A means for decreasing the first period of time when an average speed of the first initiating UE and the second initiating UE is greater than a threshold and increasing the first period of time when the average speed of the first initiating UE and the second initiating UE is less than the threshold, and a means for decreasing the second period of time when the average speed of the first initiating UE and the second initiating UE is greater than the threshold and increasing the second period of time when the average speed of the first initiating UE and the second initiating UE is less than the threshold may be, e.g., the one or more processors 402 with dedicated hardware or implementing executable code or software instructions in memory 404 and/or medium 420, such as the T1/T2 determination module 434. In one implementation, the first UE may send an indication of the second period of time to the first initiating UE and the second initiating UE, wherein the first initiating UE initiates a fourth ranging session after the second period of time and the second initiating UE initiates a fifth ranging session after the second period of time, e.g., as discussed in reference to combined ranging session 322 in FIG. 3. A means for sending an indication of the second period of time to the first initiating UE and the second initiating UE, wherein the first initiating UE initiates a fourth ranging session after the second period of time and the second initiating UE initiates a fifth ranging session after the second period of time may be, e.g., the transceiver 414 and the one or more processors 402 with dedicated hardware or implementing executable code or software instructions in memory 404 and/or medium 420, such as the T1/T2 determination module 434.

By way of example, the first UE may receive a fourth plurality of pre-ranging messages from the UEs in the third set of ranging sessions in response to the third plurality of pre-ranging messages broadcast by the UE, e.g., as discussed in reference to pre-PRS 204 in FIG. 2 and pre-PRS messages 324 in combined ranging sessions 322 in FIG. 3. The first UE may broadcast a first plurality of ranging signals in the third set of ranging sessions and may receive a second plurality of ranging signals from the UEs in the third set of ranging sessions in response to the first plurality of ranging signals broadcast by the UE, e.g., as discussed in reference to PRS 206 in FIG. 2 and PRS messages 326 in combined ranging sessions 322 in FIG. 3. The first UE may broadcast a first plurality of post-ranging signals in the third set of ranging sessions and receive a second plurality of post-ranging signals from the UEs in the third set of ranging sessions in response to the first plurality of post-ranging signals broadcast by the UE, e.g., as discussed in reference to post-PRS 208 in FIG. 2 and post-PRS messages 328 in combined ranging sessions 322 in FIG. 3. A means for receiving a fourth plurality of pre-ranging messages from the UEs in the third set of ranging sessions in response to the third plurality of pre-ranging messages broadcast by the UE may be, e.g., the transceiver 414 and the one or more processors 402 with dedicated hardware or implementing executable code or software instructions in memory 404 and/or medium 420, such as the ranging module 421 and the pre-PRS message module 422. A means for broadcasting a first plurality of ranging signals in the third set of ranging sessions and a means for receiving a second plurality of ranging signals from the UEs in the third set of ranging sessions in response to the first plurality of ranging signals broadcast by the UE may be, e.g., the transceiver 414 and the one or more processors 402 with dedicated hardware or implementing executable code or software instructions in memory 404 and/or medium 420, such as the ranging module 421 and the PRS module 424. A means for broadcasting a first plurality of post-ranging signals in the third set of ranging sessions and a means for receiving a second plurality of post-ranging signals from the UEs in the third set of ranging sessions in response to the first plurality of post-ranging signals broadcast by the UE may be, e.g., the transceiver 414 and the one or more processors 402 with dedicated hardware or implementing executable code or software instructions in memory 404 and/or medium 420, such as the ranging module 421 and the post-PRS message module 426.

Figure 6:
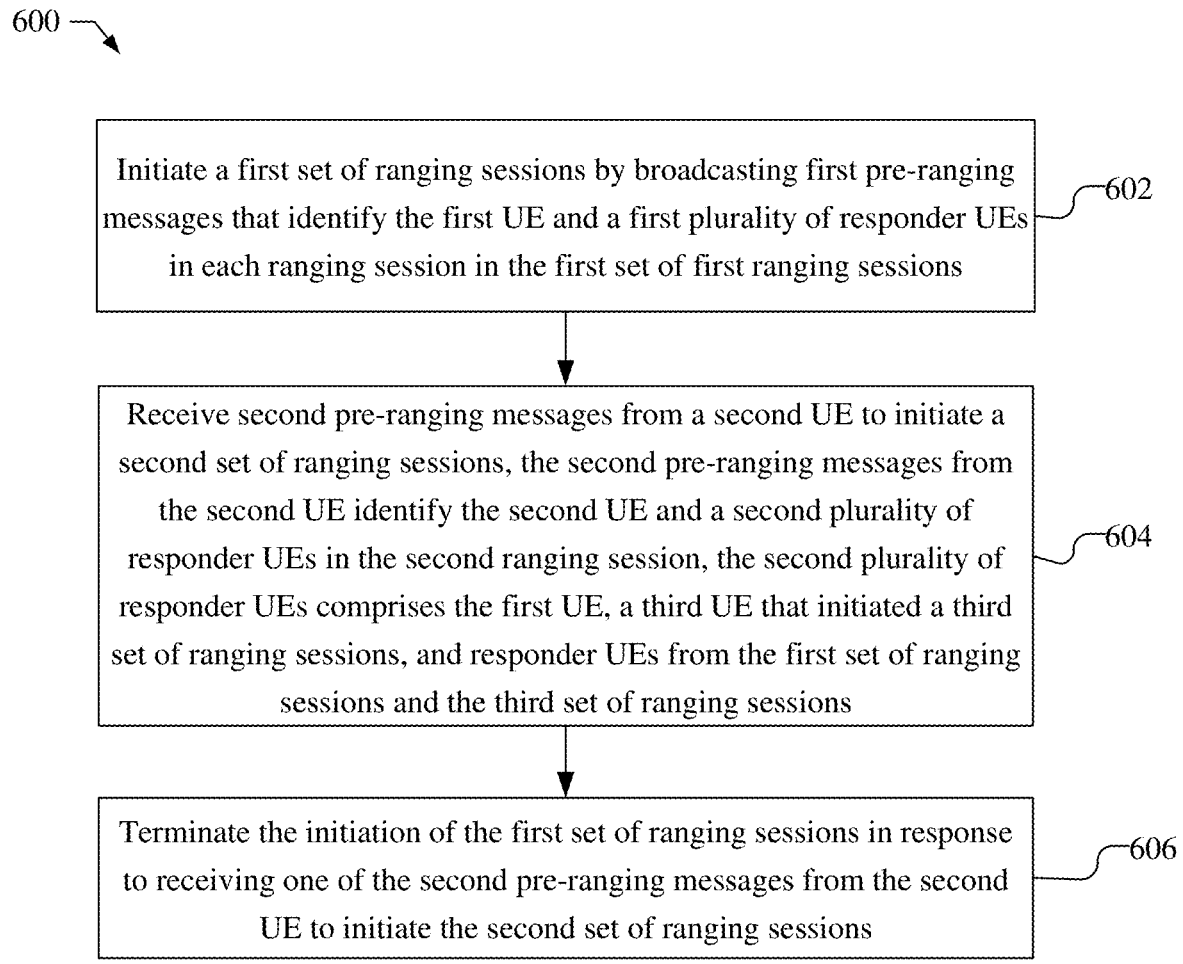
FIG. 6 is a flow chart illustrating a method of ranging between UEs.

FIG. 6 is a flow chart 600 illustrating a method of ranging performed by a first user equipment (UE) in a distributed system of UEs. The first UE, for example, may be the UEX in FIG. 3 or UE 400 in FIG. 4.

At block 602, the first UE initiates a first set of ranging sessions by broadcasting first pre-ranging messages that identify the first UE and a first plurality of responder UEs in each ranging session in the first set of first ranging sessions, such as discussed in reference to the pre-PRS messages 304 in ranging sessions 302 in FIG. 3. A means for initiating a first set of ranging sessions by broadcasting first pre-ranging messages that identify the first UE and a first plurality of responder UEs in each ranging session in the first set of first ranging sessions may be, e.g., the transceiver 414 and the one or more processors 402 with dedicated hardware or implementing executable code or software instructions in memory 404 and/or medium 420, such as the ranging module 421 and the pre-PRS message module 422.

At block 604, the first UE receives second pre-ranging messages from a second UE to initiate a second set of ranging sessions, the second pre-ranging messages from the second UE identify the second UE and a second plurality of responder UEs in the second ranging session, the second plurality of responder UEs comprises the first UE, a third UE that initiated a third set of ranging sessions, and responder UEs from the first set of ranging sessions and the third set of ranging sessions, such as discussed in reference to the pre-PRS messages 324 in combined ranging sessions 322 in FIG. 3. The second UE, for example, may be included in the first plurality of responder UEs, and the second UE may be an anchor UE with a known position that is provided to the first UE for positioning, e.g., as discussed in reference to the post-PRS messages 308 in ranging sessions 302 in FIG. A means for receiving second pre-ranging messages from a second UE to initiate a second set of ranging sessions, the second pre-ranging messages from the second UE identify the second UE and a second plurality of responder UEs in the second ranging session, the second plurality of responder UEs comprises the first UE, a third UE that initiated a third set of ranging sessions, and responder UEs from the first set of ranging sessions and the third set of ranging sessions may be, e.g., the transceiver 414 and the one or more processors 402 with dedicated hardware or implementing executable code or software instructions in memory 404 and/or medium 420, such as the combine ranging module 436, the ranging module 421 and the pre-PRS message module 422.

At block 606, the first UE terminates the initiation of the first set of ranging sessions in response to receiving one of the second pre-ranging messages from the second UE to initiate the second set of ranging sessions, e.g., as discussed in reference to combined ranging sessions 322 in FIG. 3. A means for terminating the initiation of the first set of ranging sessions in response to receiving one of the second pre-ranging messages from the second UE to initiate the second set of ranging sessions may be, e.g., the one or more processors 402 with dedicated hardware or implementing executable code or software instructions in memory 404 and/or medium 420, such as the combine ranging module 436 and the ranging module 421.

In one implementation, the first UE may initiate a fourth set of ranging sessions after the second set of ranging sessions terminates, e.g., as discussed in reference to the combined ranging sessions 322 in FIG. 3. A means for initiating a fourth set of ranging sessions after the second set of ranging sessions terminates may be, e.g., the transceiver 414 and the one or more processors 402 with dedicated hardware or implementing executable code or software instructions in memory 404 and/or medium 420, such as the combine ranging module 436 and the ranging module 421. For example, the fourth set of ranging sessions may be initiated in response to a termination of receiving the second pre-ranging messages from the second UE to initiate the second set of ranging sessions, e.g., as discussed in reference to the combined ranging sessions 322 in FIG. 3. In another example, first UE may receive an indication of a period of time for the second set of ranging sessions, wherein the fourth set of ranging sessions are initiated after expiration of the period of time, e.g., as discussed, e.g., as discussed in reference to the combined ranging sessions 322 in FIG. 3. In one implementation, for example, a length of the period of time may be based on speeds of the first UE and the third UE. A means for receiving an indication of a period of time for the second set of ranging sessions, wherein the fourth set of ranging sessions are initiated after expiration of the period of time may be, e.g., the transceiver 414 and the one or more processors 402 with dedicated hardware or implementing executable code or software instructions in memory 404 and/or medium 420, such as the combine ranging module 436, the ranging module 421 and the pre-PRS message module 422.

In one implementation, the responder UEs from the first set of ranging sessions and the third set of ranging sessions may be the first plurality of responder UEs and any responder UEs in the third set of ranging sessions that are not included in the first plurality of responder UEs, e.g., as discussed in reference to the combined ranging sessions 322 of FIG. 3.

By way of example, the first UE may receive third pre-ranging messages from the responder UEs in the first set of ranging sessions in response to the first pre-ranging messages broadcast by the first UE, e.g., as discussed in reference to pre-PRS messages 204 in FIG. 2 and pre-PRS messages 304 in ranging sessions 302 in FIG. 3. The first UE may broadcast a first plurality of ranging signals and may receive a second plurality of ranging signals from the responder UEs in the first set of ranging sessions in response to the first plurality of ranging signals broadcast by the first UE, e.g., as discussed in reference to PRS messages 206 in FIG. 2 and PRS messages 306 in ranging sessions 302 in FIG. 3. The first UE may broadcast a first plurality of post-ranging signals and receive a second plurality of post-ranging signals from the responder UEs in the first set of ranging sessions in response to the first plurality of post-ranging signals broadcast by the first UE, e.g., as discussed in reference to post-PRS messages 208 in FIG. 2 and post-PRS messages 308 in ranging sessions 302 in FIG. 3. A means for receiving third pre-ranging messages from the responder UEs in the first set of ranging sessions in response to the first pre-ranging messages broadcast by the first UE may be, e.g., the transceiver 414 and the one or more processors 402 with dedicated hardware or implementing executable code or software instructions in memory 404 and/or medium 420, such as the ranging module 421 and the pre-PRS message module 422. A means for broadcasting a first plurality of ranging signals and a means for receiving a second plurality of ranging signals from the responder UEs in the first set of ranging sessions in response to the first plurality of ranging signals broadcast by the first UE may be, e.g., the transceiver 414 and the one or more processors 402 with dedicated hardware or implementing executable code or software instructions in memory 404 and/or medium 420, such as the ranging module 421 and the PRS module 424. A means for broadcasting a first plurality of post-ranging signals and a means for receiving a second plurality of post-ranging signals from the responder UEs in the first set of ranging sessions in response to the first plurality of post-ranging signals broadcast by the first UE may be, e.g., the transceiver 414 and the one or more processors 402 with dedicated hardware or implementing executable code or software instructions in memory 404 and/or medium 420, such as the ranging module 421 and the post-PRS message module 426.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general-purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared, or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures, or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Implementation examples are described in the following numbered clauses:

1. A method of ranging performed by a first user equipment (UE) in a distributed system of UEs, the method comprising:
monitoring a first set of ranging sessions initiated by a first initiator UE, the first set of ranging sessions comprising a first plurality of pre-ranging messages broadcast by the first initiator UE that identifies UEs in the first set of ranging sessions;
monitoring a second set of ranging sessions initiated by a second initiator UE, the second set of ranging sessions comprising a second plurality of pre-ranging messages broadcast by the second initiator UE that identifies UEs in the second set of ranging sessions; and
initiating a third set of ranging sessions by broadcasting a third plurality of pre-ranging messages that identifies UEs in the third set of ranging sessions that comprises the UEs in the first set of ranging sessions and the UEs in the second set of ranging sessions.

2. The method of clause 1, wherein the first UE is an anchor UE with a known position that the first UE provides to the first initiator UE and the second initiator UE for positioning.

3. The method of either of clauses 1 or 2, wherein the first set of ranging sessions and the second set of ranging sessions are terminated in response to the initiation of the third set of ranging sessions.

4. The method of any of clauses 1-3, further comprising determining speeds of the first initiator UE and the second initiator UE while monitoring the first ranging session and the second ranging session.

5. The method of clause 4, wherein the first set of ranging sessions and the second set of ranging sessions are monitored for a first period of time, and wherein the third set of ranging sessions is performed for a second period of time, wherein the first period of time and the second period of time are based on speeds of the first initiator UE and the second initiator UE.

6. The method of clause 5, further comprising:
decreasing the first period of time when an average speed of the first initiator UE and the second initiator UE is greater than a threshold and increasing the first period of time when the average speed of the first initiator UE and the second initiator UE is less than the threshold; and
decreasing the second period of time when the average speed of the first initiator UE and the second initiator UE is greater than the threshold and increasing the second period of time when the average speed of the first initiator UE and the second initiator UE is less than the threshold.

7. The method of clause 5, further comprising:
sending an indication of the second period of time to the first initiator UE and the second initiator UE, wherein the first initiator UE initiates a fourth ranging session after the second period of time and the second initiator UE initiates a fifth ranging session after the second period of time.

8. The method of any of clauses 1-7, further comprising:
receiving a fourth plurality of pre-ranging messages from the UEs in the third set of ranging sessions in response to the third plurality of pre-ranging messages broadcast by the UE;
broadcasting a first plurality of ranging signals in the third set of ranging sessions;
receiving a second plurality of ranging signals from the UEs in the third set of ranging sessions in response to the first plurality of ranging signals broadcast by the UE;
broadcasting a first plurality of post-ranging signals in the third set of ranging sessions; and
receiving a second plurality of post-ranging signals from the UEs in the third set of ranging sessions in response to the first plurality of post-ranging signals broadcast by the UE.

9. A first user equipment (UE) configured for ranging in a distributed system of UEs, the first UE comprising:
a wireless transceiver configured to wirelessly communicate with entities in a wireless network;
at least one memory; and
at least one processor coupled to the wireless transceiver and the at least one memory, wherein the at least one processor is configured to:
monitor a first set of ranging sessions initiated by a first initiator UE, the first set of ranging sessions comprising a first plurality of pre-ranging messages broadcast by the first initiator UE that identifies UEs in the first set of ranging sessions;
monitor a second set of ranging sessions initiated by a second initiator UE, the second set of ranging sessions comprising a second plurality of pre-ranging messages broadcast by the second initiator UE that identifies UEs in the second set of ranging sessions; and
initiate a third set of ranging sessions by being configured to broadcast, via the wireless transceiver, a third plurality of pre-ranging messages that identifies UEs in the third set of ranging sessions that comprises the UEs in the first set of ranging sessions and the UEs in the second set of ranging sessions.

10. The first UE of clause 9, wherein the first UE is an anchor UE with a known position that the first UE provides to the first initiator UE and the second initiator UE for positioning.

11. The first UE of either of clauses 9 or 10, wherein the first set of ranging sessions and the second set of ranging sessions are terminated in response to the initiation of the third set of ranging sessions.

12. The first UE of any of clauses 9-11, wherein the at least one processor is further configured to determine speeds of the first initiator UE and the second initiator UE while monitoring the first ranging session and the second ranging session.

13. The first UE of clause 12, wherein the first set of ranging sessions and the second set of ranging sessions are monitored for a first period of time, and wherein the third set of ranging sessions is performed for a second period of time, wherein the first period of time and the second period of time are based on speeds of the first initiator UE and the second initiator UE.

14. The first UE of clause 13, wherein the at least one processor is further configured to:
decrease the first period of time when an average speed of the first initiator UE and the second initiator UE is greater than a threshold and increase the first period of time when the average speed of the first initiator UE and the second initiator UE is less than the threshold; and
decrease the second period of time when the average speed of the first initiator UE and the second initiator UE is greater than the threshold and increase the second period of time when the average speed of the first initiator UE and the second initiator UE is less than the threshold.

15. The first UE of clause 13, wherein the at least one processor is further configured to:
send an indication of the second period of time to the first initiator UE and the second initiator UE, wherein the first initiator UE initiates a fourth ranging session after the second period of time and the second initiator UE initiates a fifth ranging session after the second period of time.

16. The first UE of any of clauses 9-15, wherein the at least one processor is further configured to:
receive a fourth plurality of pre-ranging messages from the UEs in the third set of ranging sessions in response to the third plurality of pre-ranging messages broadcast by the UE;
broadcast a first plurality of ranging signals in the third set of ranging sessions;
receive a second plurality of ranging signals from the UEs in the third set of ranging sessions in response to the first plurality of ranging signals broadcast by the UE;
broadcast a first plurality of post-ranging signals in the third set of ranging sessions; and
receive a second plurality of post-ranging signals from the UEs in the third set of ranging sessions in response to the first plurality of post-ranging signals broadcast by the UE.

17. A first user equipment (UE) configured for ranging in a distributed system of UEs, the first UE comprising:
means for monitoring a first set of ranging sessions initiated by a first initiator UE, the first set of ranging sessions comprising a first plurality of pre-ranging messages broadcast by the first initiator UE that identifies UEs in the first set of ranging sessions;
means for monitoring a second set of ranging sessions initiated by a second initiator UE, the second set of ranging sessions comprising a second plurality of pre-ranging messages broadcast by the second initiator UE that identifies UEs in the second set of ranging sessions; and
means for initiating a third set of ranging sessions by broadcasting a third plurality of pre-ranging messages that identifies UEs in the third set of ranging sessions that comprises the UEs in the first set of ranging sessions and the UEs in the second set of ranging sessions.

18. The first UE of clause 17, wherein the first UE is an anchor UE with a known position that the first UE provides to the first initiator UE and the second initiator UE for positioning.

19. The first UE of either of clauses 17 or 18, wherein the first set of ranging sessions and the second set of ranging sessions are terminated in response to the initiation of the third set of ranging sessions.

20. The first UE of any of clauses 17-19, further comprising means for determining speeds of the first initiator UE and the second initiator UE while monitoring the first ranging session and the second ranging session.

21. The first UE of clause 20, wherein the first set of ranging sessions and the second set of ranging sessions are monitored for a first period of time, and wherein the third set of ranging sessions is performed for a second period of time, wherein the first period of time and the second period of time are based on speeds of the first initiator UE and the second initiator UE.

22. The first UE of clause 21, further comprising:
means for decreasing the first period of time when an average speed of the first initiator UE and the second initiator UE is greater than a threshold and increasing the first period of time when the average speed of the first initiator UE and the second initiator UE is less than the threshold; and
means for decreasing the second period of time when the average speed of the first initiator UE and the second initiator UE is greater than the threshold and increasing the second period of time when the average speed of the first initiator UE and the second initiator UE is less than the threshold.

23. The first UE of clause 21, further comprising:
means for sending an indication of the second period of time to the first initiator UE and the second initiator UE, wherein the first initiator UE initiates a fourth ranging session after the second period of time and the second initiator UE initiates a fifth ranging session after the second period of time.

24. The first UE of any of clauses 17-23, further comprising:
means for receiving a fourth plurality of pre-ranging messages from the UEs in the third set of ranging sessions in response to the third plurality of pre-ranging messages broadcast by the UE;
means for broadcasting a first plurality of ranging signals in the third set of ranging sessions;
means for receiving a second plurality of ranging signals from the UEs in the third set of ranging sessions in response to the first plurality of ranging signals broadcast by the UE;
means for broadcasting a first plurality of post-ranging signals in the third set of ranging sessions; and
means for receiving a second plurality of post-ranging signals from the UEs in the third set of ranging sessions in response to the first plurality of post-ranging signals broadcast by the UE.

25. A non-transitory storage medium including program code stored thereon, the program code is operable to configure at least one processor in a first user equipment (UE) configured for ranging in a distributed system of UEs, the program code comprising instructions to:
monitor a first set of ranging sessions initiated by a first initiator UE, the first set of ranging sessions comprising a first plurality of pre-ranging messages broadcast by the first initiator UE that identifies UEs in the first set of ranging sessions;
monitor a second set of ranging sessions initiated by a second initiator UE, the second set of ranging sessions comprising a second plurality of pre-ranging messages broadcast by the second initiator UE that identifies UEs in the second set of ranging sessions; and
initiate a third set of ranging sessions by broadcasting a third plurality of pre-ranging messages that identifies UEs in the third set of ranging sessions that comprises the UEs in the first set of ranging sessions and the UEs in the second set of ranging sessions.

26. The non-transitory storage medium including program code of clause 25, wherein the first UE is an anchor UE with a known position that the first UE provides to the first initiator UE and the second initiator UE for positioning.

27. The non-transitory storage medium including program code of either of clauses 25 or 26, wherein the first set of ranging sessions and the second set of ranging sessions are terminated in response to the initiation of the third set of ranging sessions.

28. The non-transitory storage medium including program code of any of clauses 25-27, further comprising determining speeds of the first initiator UE and the second initiator UE while monitoring the first ranging session and the second ranging session.

29. The non-transitory storage medium including program code of clause 28, wherein the first set of ranging sessions and the second set of ranging sessions are monitored for a first period of time, and wherein the third set of ranging sessions is performed for a second period of time, wherein the first period of time and the second period of time are based on speeds of the first initiator UE and the second initiator UE.

30. The non-transitory storage medium including program code of clause 29, further comprising instructions to:
decrease the first period of time when an average speed of the first initiator UE and the second initiator UE is greater than a threshold and increasing the first period of time when the average speed of the first initiator UE and the second initiator UE is less than the threshold; and
decrease the second period of time when the average speed of the first initiator UE and the second initiator UE is greater than the threshold and increasing the second period of time when the average speed of the first initiator UE and the second initiator UE is less than the threshold.

31. The non-transitory storage medium including program code of clause 29, further comprising instructions to:
send an indication of the second period of time to the first initiator UE and the second initiator UE, wherein the first initiator UE initiates a fourth ranging session after the second period of time and the second initiator UE initiates a fifth ranging session after the second period of time.

32. The non-transitory storage medium including program code of any of clauses 25-31, further comprising instructions to:
receive a fourth plurality of pre-ranging messages from the UEs in the third set of ranging sessions in response to the third plurality of pre-ranging messages broadcast by the UE;
broadcast a first plurality of ranging signals in the third set of ranging sessions;
receive a second plurality of ranging signals from the UEs in the third set of ranging sessions in response to the first plurality of ranging signals broadcast by the UE;
broadcast a first plurality of post-ranging signals in the third set of ranging sessions; and
receive a second plurality of post-ranging signals from the UEs in the third set of ranging sessions in response to the first plurality of post-ranging signals broadcast by the UE.

33. A method of ranging performed by a first user equipment (UE) in a distributed system of UEs, the method comprising:
initiating a first set of ranging sessions by broadcasting first pre-ranging messages that identify the first UE and a first plurality of responder UEs in each ranging session in the first set of first ranging sessions;
receiving second pre-ranging messages from a second UE to initiate a second set of ranging sessions, the second pre-ranging messages from the second UE identify the second UE and a second plurality of responder UEs in the second ranging session, the second plurality of responder UEs comprises the first UE, a third UE that initiated a third set of ranging sessions, and responder UEs from the first set of ranging sessions and the third set of ranging sessions; and
terminating the initiation of the first set of ranging sessions in response to receiving one of the second pre-ranging messages from the second UE to initiate the second set of ranging sessions.

34. The method of clause 33, wherein the second UE is included in the first plurality of responder UEs, the second UE is an anchor UE with a known position that is provided to the first UE for positioning.

35. The method of either of clauses 33 or 34, further comprising initiating a fourth set of ranging sessions after the second set of ranging sessions terminates.

36. The method of clause 35, wherein the fourth set of ranging sessions are initiated in response to a termination of receiving the second pre-ranging messages from the second UE to initiate the second set of ranging sessions.

37. The method of clause 35, further comprising receiving an indication of a period of time for the second set of ranging sessions, wherein the fourth set of ranging sessions are initiated after expiration of the period of time.

38. The method of clause 37, wherein a length of the period of time is based on speeds of the first UE and the third UE.

39. The method of any of clauses 33-38, wherein the responder UEs from the first set of ranging sessions and the third set of ranging sessions comprise the first plurality of responder UEs and any responder UEs in the third set of ranging sessions that are not included in the first plurality of responder UEs.

40. The method of any of clauses 33-39, further comprising:
receiving third pre-ranging messages from the responder UEs in the first set of ranging sessions in response to the first pre-ranging messages broadcast by the first UE;
broadcasting a first plurality of ranging signals;
receiving a second plurality of ranging signals from the responder UEs in the first set of ranging sessions in response to the first plurality of ranging signals broadcast by the first UE;
broadcasting a first plurality of post-ranging signals; and
receiving a second plurality of post-ranging signals from the responder UEs in the first set of ranging sessions in response to the first plurality of post-ranging signals broadcast by the first UE.

41. A first user equipment (UE) configured for ranging in a distributed system of UEs, the first UE comprising:
a wireless transceiver configured to wirelessly communicate with entities in a wireless network;
at least one memory; and
at least one processor coupled to the wireless transceiver and the at least one memory, wherein the at least one processor is configured to:
initiate a first set of ranging sessions by broadcasting first pre-ranging messages that identify the first UE and a first plurality of responder UEs in each ranging session in the first set of first ranging sessions;
receive second pre-ranging messages from a second UE to initiate a second set of ranging sessions, the second pre-ranging messages from the second UE identify the second UE and a second plurality of responder UEs in the second ranging session, the second plurality of responder UEs comprises the first UE, a third UE that initiated a third set of ranging sessions, and responder UEs from the first set of ranging sessions and the third set of ranging sessions; and
terminate the initiation of the first set of ranging sessions in response to receipt of one of the second pre-ranging messages from the second UE to initiate the second set of ranging sessions.

42. The first UE of clause 41, wherein the second UE is included in the first plurality of responder UEs, the second UE is an anchor UE with a known position that is provided to the first UE for positioning.

43. The first UE of either of clauses 41 or 42, wherein the at least one processor is further configured to initiate a fourth set of ranging sessions after the second set of ranging sessions terminates.

44. The first UE of clause 43, wherein the fourth set of ranging sessions are initiated in response to a termination of receipt of the second pre-ranging messages from the second UE to initiate the second set of ranging sessions.

45. The first UE of clause 43, wherein the at least one processor is further configured to receive an indication of a period of time for the second set of ranging sessions, wherein the fourth set of ranging sessions are initiated after expiration of the period of time.

46. The first UE of clause 45, wherein a length of the period of time is based on speeds of the first UE and the third UE.

47. The first UE of any of clauses 41-46, wherein the responder UEs from the first set of ranging sessions and the third set of ranging sessions comprise the first plurality of responder UEs and any responder UEs in the third set of ranging sessions that are not included in the first plurality of responder UEs.

48. The first UE of any of clauses 41-47, wherein the at least one processor is further configured to:
    receive third pre-ranging messages from the responder UEs in the first set of ranging sessions in response to the first pre-ranging messages broadcast by the first UE;
    broadcast a first plurality of ranging signals;
    receive a second plurality of ranging signals from the responder UEs in the first set of ranging sessions in response to the first plurality of ranging signals broadcast by the first UE;
    broadcast a first plurality of post-ranging signals; and
    receive a second plurality of post-ranging signals from the responder UEs in the first set of ranging sessions in response to the first plurality of post-ranging signals broadcast by the first UE.

49. A first user equipment (UE) configured for ranging in a distributed system of UEs, the first UE comprising:
    means for initiating a first set of ranging sessions by broadcasting first pre-ranging messages that identify the first UE and a first plurality of responder UEs in each ranging session in the first set of first ranging sessions;
    means for receiving second pre-ranging messages from a second UE to initiate a second set of ranging sessions, the second pre-ranging messages from the second UE identify the second UE and a second plurality of responder UEs in the second ranging session, the second plurality of responder UEs comprises the first UE, a third UE that initiated a third set of ranging sessions, and responder UEs from the first set of ranging sessions and the third set of ranging sessions; and
    means for terminating the initiation of the first set of ranging sessions in response to receiving one of the second pre-ranging messages from the second UE to initiate the second set of ranging sessions.

50. The first UE of clause 49, wherein the second UE is included in the first plurality of responder UEs, the second UE is an anchor UE with a known position that is provided to the first UE for positioning.

51. The first UE of either of clauses 49 or 50, further comprising means for initiating a fourth set of ranging sessions after the second set of ranging sessions terminates.

52. The first UE of clause 51, wherein the fourth set of ranging sessions are initiated in response to a termination of receiving the second pre-ranging messages from the second UE to initiate the second set of ranging sessions.

53. The first UE of clause 51, further comprising means for receiving an indication of a period of time for the second set of ranging sessions, wherein the fourth set of ranging sessions are initiated after expiration of the period of time.

54. The first UE of clause 53, wherein a length of the period of time is based on speeds of the first UE and the third UE.

55. The first UE of any of clauses 49-54, wherein the responder UEs from the first set of ranging sessions and the third set of ranging sessions comprise the first plurality of responder UEs and any responder UEs in the third set of ranging sessions that are not included in the first plurality of responder UEs.

56. The first UE of any of clauses 49-55, further comprising:
    means for receiving third pre-ranging messages from the responder UEs in the first set of ranging sessions in response to the first pre-ranging messages broadcast by the first UE;
    means for broadcasting a first plurality of ranging signals;
    means for receiving a second plurality of ranging signals from the responder UEs in the first set of ranging sessions in response to the first plurality of ranging signals broadcast by the first UE;
    means for broadcasting a first plurality of post-ranging signals; and
    means for receiving a second plurality of post-ranging signals from the responder UEs in the first set of ranging sessions in response to the first plurality of post-ranging signals broadcast by the first UE.

57. A non-transitory storage medium including program code stored thereon, the program code is operable to configure at least one processor in a first user equipment (UE) configured for ranging in a distributed system of UEs, the program code comprising instructions to:
    initiate a first set of ranging sessions by broadcasting first pre-ranging messages that identify the first UE and a first plurality of responder UEs in each ranging session in the first set of first ranging sessions;
    receive second pre-ranging messages from a second UE to initiate a second set of ranging sessions, the second pre-ranging messages from the second UE identify the second UE and a second plurality of responder UEs in the second ranging session, the second plurality of responder UEs comprises the first UE, a third UE that initiated a third set of ranging sessions, and responder UEs from the first set of ranging sessions and the third set of ranging sessions; and
    terminate the initiation of the first set of ranging sessions in response to receiving one of the second pre-ranging messages from the second UE to initiate the second set of ranging sessions.

58. The non-transitory storage medium including program code of clause 57, wherein the second UE is included in the first plurality of responder UEs, the second UE is an anchor UE with a known position that is provided to the first UE for positioning.

59. The non-transitory storage medium including program code of either of clauses 57 or 58, further comprising instructions to initiate a fourth set of ranging sessions after the second set of ranging sessions terminates.

60. The non-transitory storage medium including program code of clause 59, wherein the fourth set of ranging sessions are initiated in response to a termination of receiving the second pre-ranging messages from the second UE to initiate the second set of ranging sessions.

61. The non-transitory storage medium including program code of clause 59, further comprising instructions to receive an indication of a period of time for the second set of ranging sessions, wherein the fourth set of ranging sessions are initiated after expiration of the period of time.

62. The non-transitory storage medium including program code of clause 61, wherein a length of the period of time is based on speeds of the first UE and the third UE.

63. The non-transitory storage medium including program code of any of clauses 57-62, wherein the responder UEs from the first set of ranging sessions and the third set of ranging sessions comprise the first plurality of responder UEs and any responder UEs in the third set of ranging sessions that are not included in the first plurality of responder UEs.

64. The non-transitory storage medium including program code of any of clauses 57-63, further comprising instructions to:
receive third pre-ranging messages from the responder UEs in the first set of ranging sessions in response to the first pre-ranging messages broadcast by the first UE;
broadcast a first plurality of ranging signals;
receive a second plurality of ranging signals from the responder UEs in the first set of ranging sessions in response to the first plurality of ranging signals broadcast by the first UE;
broadcast a first plurality of post-ranging signals; and
receive a second plurality of post-ranging signals from the responder UEs in the first set of ranging sessions in response to the first plurality of post-ranging signals broadcast by the first UE.

Therefore, it is intended that claimed subject matter not be limited to the particular examples disclosed, but that such claimed subject matter may also include all aspects falling within the scope of appended claims, and equivalents thereof.

What is claimed is:

1. A method of ranging performed by a first user equipment (UE) in a distributed system of UEs, the method comprising:
   monitoring a first set of ranging sessions initiated by a first initiator UE, the first set of ranging sessions comprising a first plurality of pre-ranging messages broadcast by the first initiator UE that identifies UEs in the first set of ranging sessions;
   monitoring a second set of ranging sessions initiated by a second initiator UE, the second set of ranging sessions comprising a second plurality of pre-ranging messages broadcast by the second initiator UE that identifies UEs in the second set of ranging sessions; and
   initiating a third set of ranging sessions by broadcasting a third plurality of pre-ranging messages that identifies UEs in the third set of ranging sessions that comprises the UEs in the first set of ranging sessions and the UEs in the second set of ranging sessions.

2. The method of claim 1, wherein the first UE is an anchor UE with a known position that the first UE provides to the first initiator UE and the second initiator UE for positioning.

3. The method of claim 1, wherein the first set of ranging sessions and the second set of ranging sessions are terminated in response to the initiation of the third set of ranging sessions.

4. The method of claim 1, further comprising determining speeds of the first initiator UE and the second initiator UE while monitoring the first ranging session and the second ranging session.

5. The method of claim 4, wherein the first set of ranging sessions and the second set of ranging sessions are monitored for a first period of time, and wherein the third set of ranging sessions is performed for a second period of time, wherein the first period of time and the second period of time are based on speeds of the first initiator UE and the second initiator UE.

6. The method of claim 5, further comprising:
decreasing the first period of time when an average speed of the first initiator UE and the second initiator UE is greater than a threshold and increasing the first period of time when the average speed of the first initiator UE and the second initiator UE is less than the threshold; and
decreasing the second period of time when the average speed of the first initiator UE and the second initiator UE is greater than the threshold and increasing the second period of time when the average speed of the first initiator UE and the second initiator UE is less than the threshold.

7. The method of claim 5, further comprising:
sending an indication of the second period of time to the first initiator UE and the second initiator UE, wherein the first initiator UE initiates a fourth ranging session after the second period of time and the second initiator UE initiates a fifth ranging session after the second period of time.

8. The method of claim 1, further comprising:
receiving a fourth plurality of pre-ranging messages from the UEs in the third set of ranging sessions in response to the third plurality of pre-ranging messages broadcast by the UE;
broadcasting a first plurality of ranging signals in the third set of ranging sessions;
receiving a second plurality of ranging signals from the UEs in the third set of ranging sessions in response to the first plurality of ranging signals broadcast by the UE;
broadcasting a first plurality of post-ranging signals in the third set of ranging sessions; and
receiving a second plurality of post-ranging signals from the UEs in the third set of ranging sessions in response to the first plurality of post-ranging signals broadcast by the UE.

9. A first user equipment (UE) configured for ranging in a distributed system of UEs, the first UE comprising:
a wireless transceiver configured to wirelessly communicate with entities in a wireless network;
at least one memory; and
at least one processor coupled to the wireless transceiver and the at least one memory, wherein the at least one processor is configured to:
monitor a first set of ranging sessions initiated by a first initiator UE, the first set of ranging sessions comprising a first plurality of pre-ranging messages broadcast by the first initiator UE that identifies UEs in the first set of ranging sessions;
monitor a second set of ranging sessions initiated by a second initiator UE, the second set of ranging sessions comprising a second plurality of pre-ranging messages broadcast by the second initiator UE that identifies UEs in the second set of ranging sessions; and
initiate a third set of ranging sessions by being configured to broadcast, via the wireless transceiver, a third plurality of pre-ranging messages that identifies UEs in the third set of ranging sessions that comprises the UEs in the first set of ranging sessions and the UEs in the second set of ranging sessions.

10. The first UE of claim 9, wherein the first UE is an anchor UE with a known position that the first UE provides to the first initiator UE and the second initiator UE for positioning.

11. The first UE of claim 9, wherein the first set of ranging sessions and the second set of ranging sessions are terminated in response to the initiation of the third set of ranging sessions.

12. The first UE of claim 9, wherein the at least one processor is further configured to determine speeds of the first initiator UE and the second initiator UE while monitoring the first ranging session and the second ranging session.

13. The first UE of claim 12, wherein the first set of ranging sessions and the second set of ranging sessions are monitored for a first period of time, and wherein the third set of ranging sessions is performed for a second period of time, wherein the first period of time and the second period of time are based on speeds of the first initiator UE and the second initiator UE.

14. The first UE of claim 13, wherein the at least one processor is further configured to:
  decrease the first period of time when an average speed of the first initiator UE and the second initiator UE is greater than a threshold and increase the first period of time when the average speed of the first initiator UE and the second initiator UE is less than the threshold; and
  decrease the second period of time when the average speed of the first initiator UE and the second initiator UE is greater than the threshold and increase the second period of time when the average speed of the first initiator UE and the second initiator UE is less than the threshold.

15. The first UE of claim 13, wherein the at least one processor is further configured to:
  send an indication of the second period of time to the first initiator UE and the second initiator UE, wherein the first initiator UE initiates a fourth ranging session after the second period of time and the second initiator UE initiates a fifth ranging session after the second period of time.

16. The first UE of claim 9, wherein the at least one processor is further configured to:
  receive a fourth plurality of pre-ranging messages from the UEs in the third set of ranging sessions in response to the third plurality of pre-ranging messages broadcast by the UE;
  broadcast a first plurality of ranging signals in the third set of ranging sessions;
  receive a second plurality of ranging signals from the UEs in the third set of ranging sessions in response to the first plurality of ranging signals broadcast by the UE;
  broadcast a first plurality of post-ranging signals in the third set of ranging sessions; and
  receive a second plurality of post-ranging signals from the UEs in the third set of ranging sessions in response to the first plurality of post-ranging signals broadcast by the UE.

17. A first user equipment (UE) configured for ranging in a distributed system of UEs, the first UE comprising:
  means for monitoring a first set of ranging sessions initiated by a first initiator UE, the first set of ranging sessions comprising a first plurality of pre-ranging messages broadcast by the first initiator UE that identifies UEs in the first set of ranging sessions;
  means for monitoring a second set of ranging sessions initiated by a second initiator UE, the second set of ranging sessions comprising a second plurality of pre-ranging messages broadcast by the second initiator UE that identifies UEs in the second set of ranging sessions; and
  means for initiating a third set of ranging sessions by broadcasting a third plurality of pre-ranging messages that identifies UEs in the third set of ranging sessions that comprises the UEs in the first set of ranging sessions and the UEs in the second set of ranging sessions.

18. The first UE of claim 17, wherein the first UE is an anchor UE with a known position that the first UE provides to the first initiator UE and the second initiator UE for positioning.

19. The first UE of claim 17, wherein the first set of ranging sessions and the second set of ranging sessions are terminated in response to the initiation of the third set of ranging sessions.

20. The first UE of claim 17, further comprising means for determining speeds of the first initiator UE and the second initiator UE while monitoring the first ranging session and the second ranging session, wherein the first set of ranging sessions and the second set of ranging sessions are monitored for a first period of time, and wherein the third set of ranging sessions is performed for a second period of time, wherein the first period of time and the second period of time are based on speeds of the first initiator UE and the second initiator UE.

21. The first UE of claim 20, further comprising:
  means for decreasing the first period of time when an average speed of the first initiator UE and the second initiator UE is greater than a threshold and increasing the first period of time when the average speed of the first initiator UE and the second initiator UE is less than the threshold; and
  means for decreasing the second period of time when the average speed of the first initiator UE and the second initiator UE is greater than the threshold and increasing the second period of time when the average speed of the first initiator UE and the second initiator UE is less than the threshold.

22. The first UE of claim 20, further comprising:
  means for sending an indication of the second period of time to the first initiator UE and the second initiator UE, wherein the first initiator UE initiates a fourth ranging session after the second period of time and the second initiator UE initiates a fifth ranging session after the second period of time.

23. A method of ranging performed by a first user equipment (UE) in a distributed system of UEs, the method comprising:
  initiating a first set of ranging sessions by broadcasting first pre-ranging messages that identify the first UE and a first plurality of responder UEs in each ranging session in the first set of first ranging sessions;
  receiving second pre-ranging messages from a second UE to initiate a second set of ranging sessions, the second pre-ranging messages from the second UE identify the second UE and a second plurality of responder UEs in the second ranging session, the second plurality of responder UEs comprises the first UE, a third UE that initiated a third set of ranging sessions, and responder UEs from the first set of ranging sessions and the third set of ranging sessions; and
  terminating the initiation of the first set of ranging sessions in response to receiving one of the second pre-ranging messages from the second UE to initiate the second set of ranging sessions.

24. The method of claim 23, wherein the second UE is included in the first plurality of responder UEs, the second UE is an anchor UE with a known position that is provided to the first UE for positioning.

25. The method of claim 23, further comprising initiating a fourth set of ranging sessions after the second set of ranging sessions terminates.

26. The method of claim 25, wherein the fourth set of ranging sessions are initiated in response to a termination of receiving the second pre-ranging messages from the second UE to initiate the second set of ranging sessions.

27. The method of claim 25, further comprising receiving an indication of a period of time for the second set of ranging sessions, wherein the fourth set of ranging sessions are initiated after expiration of the period of time.

28. The method of claim 27, wherein a length of the period of time is based on speeds of the first UE and the third UE.

29. The method of claim 23, wherein the responder UEs from the first set of ranging sessions and the third set of ranging sessions comprise the first plurality of responder UEs and any responder UEs in the third set of ranging sessions that are not included in the first plurality of responder UEs.

30. The method of claim 23, further comprising:
receiving third pre-ranging messages from the responder UEs in the first set of ranging sessions in response to the first pre-ranging messages broadcast by the first UE;
broadcasting a first plurality of ranging signals;
receiving a second plurality of ranging signals from the responder UEs in the first set of ranging sessions in response to the first plurality of ranging signals broadcast by the first UE;
broadcasting a first plurality of post-ranging signals; and
receiving a second plurality of post-ranging signals from the responder UEs in the first set of ranging sessions in response to the first plurality of post-ranging signals broadcast by the first UE.

31. A first user equipment (UE) configured for ranging in a distributed system of UEs, the first UE comprising:
a wireless transceiver configured to wirelessly communicate with entities in a wireless network;
at least one memory; and
at least one processor coupled to the wireless transceiver and the at least one memory, wherein the at least one processor is configured to:
initiate a first set of ranging sessions by broadcasting first pre-ranging messages that identify the first UE and a first plurality of responder UEs in each ranging session in the first set of first ranging sessions;
receive second pre-ranging messages from a second UE to initiate a second set of ranging sessions, the second pre-ranging messages from the second UE identify the second UE and a second plurality of responder UEs in the second ranging session, the second plurality of responder UEs comprises the first UE, a third UE that initiated a third set of ranging sessions, and responder UEs from the first set of ranging sessions and the third set of ranging sessions; and
terminate the initiation of the first set of ranging sessions in response to receipt of one of the second pre-ranging messages from the second UE to initiate the second set of ranging sessions.

32. The first UE of claim 31, wherein the second UE is included in the first plurality of responder UEs, the second UE is an anchor UE with a known position that is provided to the first UE for positioning.

33. The first UE of claim 31, wherein the at least one processor is further configured to initiate a fourth set of ranging sessions after the second set of ranging sessions terminates.

34. The first UE of claim 33, wherein the fourth set of ranging sessions are initiated in response to a termination of receipt of the second pre-ranging messages from the second UE to initiate the second set of ranging sessions.

35. The first UE of claim 33, wherein the at least one processor is further configured to receive an indication of a period of time for the second set of ranging sessions, wherein the fourth set of ranging sessions are initiated after expiration of the period of time.

36. The first UE of claim 35, wherein a length of the period of time is based on speeds of the first UE and the third UE.

37. The first UE of claim 31, wherein the responder UEs from the first set of ranging sessions and the third set of ranging sessions comprise the first plurality of responder UEs and any responder UEs in the third set of ranging sessions that are not included in the first plurality of responder UEs.

38. The first UE of claim 31, wherein the at least one processor is further configured to:
receive third pre-ranging messages from the responder UEs in the first set of ranging sessions in response to the first pre-ranging messages broadcast by the first UE;
broadcast a first plurality of ranging signals;
receive a second plurality of ranging signals from the responder UEs in the first set of ranging sessions in response to the first plurality of ranging signals broadcast by the first UE;
broadcast a first plurality of post-ranging signals; and
receive a second plurality of post-ranging signals from the responder UEs in the first set of ranging sessions in response to the first plurality of post-ranging signals broadcast by the first UE.

39. A first user equipment (UE) configured for ranging in a distributed system of UEs, the first UE comprising:
means for initiating a first set of ranging sessions by broadcasting first pre-ranging messages that identify the first UE and a first plurality of responder UEs in each ranging session in the first set of first ranging sessions;
means for receiving second pre-ranging messages from a second UE to initiate a second set of ranging sessions, the second pre-ranging messages from the second UE identify the second UE and a second plurality of responder UEs in the second ranging session, the second plurality of responder UEs comprises the first UE, a third UE that initiated a third set of ranging sessions, and responder UEs from the first set of ranging sessions and the third set of ranging sessions; and
means for terminating the initiation of the first set of ranging sessions in response to receiving one of the second pre-ranging messages from the second UE to initiate the second set of ranging sessions.

40. The first UE of claim 39, wherein the second UE is included in the first plurality of responder UEs, the second UE is an anchor UE with a known position that is provided to the first UE for positioning.

41. The first UE of claim 39, further comprising means for initiating a fourth set of ranging sessions after the second set of ranging sessions terminates, wherein the fourth set of ranging sessions are initiated in response to a termination of receiving the second pre-ranging messages from the second UE to initiate the second set of ranging sessions.

42. The first UE of claim 39, further comprising means for initiating a fourth set of ranging sessions after the second set of ranging sessions terminates, the first UE further comprising means for receiving an indication of a period of time for the second set of ranging sessions, wherein the fourth set of ranging sessions are initiated after expiration of the period of time, and wherein a length of the period of time is based on speeds of the first UE and the third UE.

* * * * *